(12) United States Patent
McGough

(10) Patent No.: US 11,973,754 B2
(45) Date of Patent: *Apr. 30, 2024

(54) FAST UNBREAKABLE CIPHER

(71) Applicant: Qwyit LLC, Great Falls, VA (US)

(72) Inventor: R Paul McGough, Manassas, VA (US)

(73) Assignee: Qwyit LLC, Great Falls, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,283

(22) Filed: Jul. 25, 2023

(65) Prior Publication Data
US 2023/0370450 A1 Nov. 16, 2023

Related U.S. Application Data

(63) Continuation of application No. 17/239,317, filed on Apr. 23, 2021, now Pat. No. 11,711,364, and a continuation of application No. 17/239,352, filed on Apr. 23, 2021, now Pat. No. 11,711,365.

(51) Int. Cl.
| | | |
|---|---|---|
| *H04L 9/30* | (2006.01) | |
| *G09C 1/00* | (2006.01) | |
| *H04L 9/06* | (2006.01) | |
| *H04L 9/08* | (2006.01) | |
| *H04L 9/40* | (2022.01) | |

(52) U.S. Cl.
CPC ............ *H04L 63/0869* (2013.01); *G09C 1/00* (2013.01); *H04L 9/0618* (2013.01); *H04L 9/0631* (2013.01); *H04L 9/0656* (2013.01); *H04L 9/0662* (2013.01); *H04L 9/0861* (2013.01); *H04L 9/0869* (2013.01); *H04L 9/3033* (2013.01); *H04L 9/3066* (2013.01); *H04L 63/0478* (2013.01); *H04L 63/0884* (2013.01); *H04L 2209/12* (2013.01)

(58) Field of Classification Search
CPC ....... H04L 9/06; H04L 9/0631; H04L 9/0656; H04L 9/0662; H04L 9/08; H04L 9/0869; H04L 9/30; H04L 9/3033; H04L 9/3066; H04L 63/04; H04L 63/0435; H04L 63/08; H04L 63/0869

See application file for complete search history.

(56) References Cited

U.S. PATENT DOCUMENTS

| | | | |
|---|---|---|---|
| 2002/0071552 A1* | 6/2002 | Rogaway | H04L 9/3242 380/37 |
| 2006/0104268 A1* | 5/2006 | Lee | H04L 45/60 370/389 |
| 2008/0279373 A1* | 11/2008 | Erhart | H04L 9/3249 714/E11.017 |
| 2010/0150350 A1* | 6/2010 | Reidenbach | H04L 9/0631 380/29 |

(Continued)

*Primary Examiner* — Shaqueal D Wade-Wright
(74) *Attorney, Agent, or Firm* — MICHAEL P FORTKORT PC; Michael P. Fortkort, Esq.

(57) ABSTRACT

An encryption protocol is provided that can be implemented within a single clock cycle of an integrated circuit chip while still providing unbreakable encryption. The protocol of the present invention is so small that it can co-exist on any integrated circuit chip with other functions, including a general purpose central processing unit, general processing unit, or application specific integrated circuits with other communication related functionality.

20 Claims, 8 Drawing Sheets

(56) References Cited

U.S. PATENT DOCUMENTS

| | | | |
|---|---|---|---|
| 2011/0158402 A1* | 6/2011 | Sichitiu | H04L 9/12 |
| | | | 380/42 |
| 2011/0292990 A1* | 12/2011 | Flynn | G01R 13/0272 |
| | | | 375/229 |
| 2020/0169383 A1* | 5/2020 | Durham | H04L 9/0637 |
| 2022/0224510 A1* | 7/2022 | Kishinevsky | G06F 12/1425 |

* cited by examiner

FIG 1

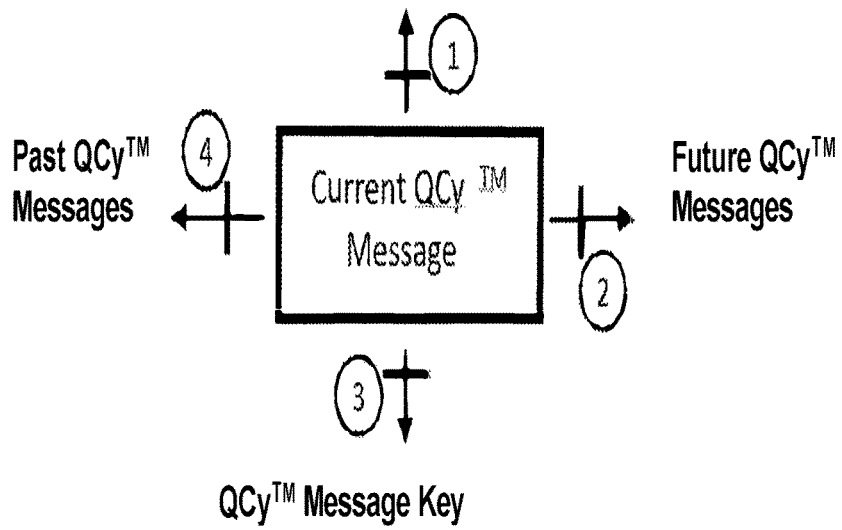

Upper Level QCy™ Authentication Keys

QCy™ Message Key

System Assumptions:
- Upper Level QCy™ Authentication Keys are securely pre-shared
    - By participant-managed, independent trust Q-ANON™ system, or other
- QCy™ Auth Keys create unique, new message keys for every message

Perfect Security IF:
1. Broken Current Message does NOT reveal Authentication Keys (One-way math gate)
2. Broken Current Message does NOT reveal Future Messages (One-way math gate)
3. Current Message is Provably Secure (Math proved, Shannon Secure)
    • Known Plaintext reveals key, but 1, 2 and 4 still hold - as does any remaining msg
4. Broken Current Message does NOT reveal Past Messages (One-way math gate)

The system is Perfect Cross Secure when it stops all attacks in all directions

FIG 2

*Default QCy™ PDAF_SEC Cipher*

The PDAF_SEC's process of underdetermined linear equations:

Qwyit™ ID: OpenID [This is the public Qwyit™ Community ID]
Qwyit™ Keys: *EK, QK* [These are the upper level Qwyit™ Authentication Keys]
Initialization Vector: OR [A randomly generated public Initialization Vector]

Session Start: *QK* MOD16 OR = *VKP* then PDAF(*EK, VKP*) = *VKC* [Starting *ValueKey*]
*EK* MOD16 OR = *OKP* then PDAF(*QK, OKP*) = *OKC* [Starting *OffsetKey*]

Selection: *VKPc[1...n]Pv[1...n]* MOD16 *OKPo[1...n]* = *W1...n2*
Where pointer *Pv* and *Po* increment +1 through the key length for each cycle pointer *Pc* [This is a PDAF in Dual Key mode]
If repeating, substitute *VKN* and *OKN* for each new cycle Cipher: *W1...n2* ⊕ *PT1...n2* = CT1...*n2* repeating w/next cycle selection if more *PT*

Update (more *PT*): Update ValueKey: PDAF(*OKC, VKP*) = *VKNext*
Update OffsetKey: PDAF(*VKC, OKP*) = *OKNext*
Where the PDAF performed is the Key Offset Add mode Repeat: Cycle through Selection, Cipher, Updates, replacing *VK* and *OK* until *PT*, CT completed Send: Per Message[OpenID, OR, CT] to the OpenID location of intended recipient

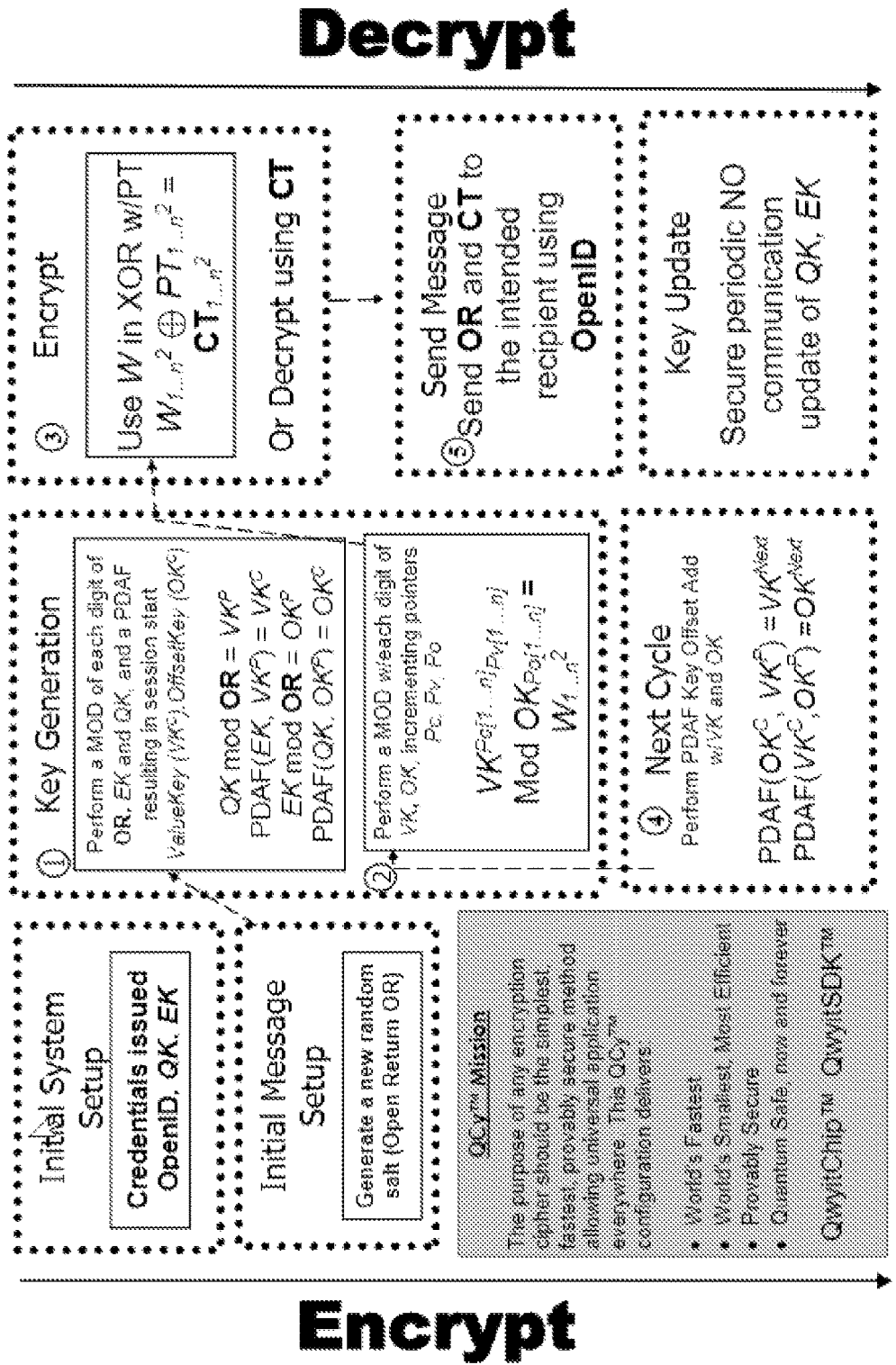

FIG 4

| Case | General Equation* | Description |
|---|---|---|
| 1 | $VK^i \bmod OK^i = W^i$ | Default: DUAL KEY ADD mode. ValueKey plus OffsetKey, starting at digit 1 of each and adding that position. Continue until all digits have been added to each other |
| 2 | $VK^i \bmod VK^x = W^i$ | OFFSET KEY ADD mode. ValueKey plus OffsetKey into ValueKey, starting at digit 'one to the right' = zeroth digit |
| 3 | $OK^i \bmod OK^x = W^i$ | OFFSET KEY ADD mode. OffsetKey plus ValueKey into OffsetKey, starting at digit 'one to the right' = zeroth digit |

*NOTE: These cycle through as indicated in the default description above – these represent the first W created

PDAF_SEC Output Test using Reference Keys and Plaintext

```
EK: 0123456789ABCDEFFEDCBA9876543210 0123456789ABCDEFFEDCBA9876543210, OK: FEDCBA9876543210 0123456789ABCDEFF
OR: 00112233445566778899AABBCCDDEEFFFEDDCCBBAA99887766554433221100
Plaintext: ABCDEFGH
VKpointer: FEEDDCCBBAA99887766CEF124578A8DEED8A3276421FECB9878859AABBCCDDEEF, OKpointer: 01234679ACDF0236678655443221 10FF001122334455667866322FDCA9764310
VKstart: F0011223344556677852ECEF0036678A8DEF001122334F023564FE1ECAA8BCCDBEEF, OKstart: 0A63F34CDF7336393CEF124578A8DFFB9641FC A75556677889F124578A8DE Case 1, Dual Key Add mode - starting at digit 1 of each key and MOD16 adding that position
Case 1, value 1: VK 1:15 + OK 1:13 = C, then Xor with PT 1:A = ASCII_value 2

Case 2, Offset Key Add mode - ValueKey MOD16 added to the OffsetKey pointing back into the ValueKey, starting at digit (one to the right) = zeroth digit
Case 2, value 1: VK:13 to-the-right: 6 = 5, then Xor with PT 2:B = ASCII_value 119

Case 3, Offset Key Add mode - OffsetKey MOD16 added to the ValueKey pointing back into the OffsetKey, starting at digit (one to the right) = zeroth digit
Case 3, value 1: OK 1:13 + OK15 to-the-right: 8 = 5, then Xor with PT 3:C = ASCII_value 118

Case 1, Dual Key Add mode - Continuing with next digit position
Case 1, value 2: VK 2: 0 + OK 2: 10 = A, then Xor with PT 4:D = ASCII_value 5

Case 2, Offset Key Add mode - Continuing with next digit position
Case 2, value 2: VK 2: 0 + VK10 to-the-right: 5 = 5, then Xor with PT 5:E = ASCII_value 112

Case 3, Offset Key Add mode - Continuing with next digit position
Case 3, value 2: OK 2: 10 + OK0 to-the-right: 6 = 0, then Xor with PT 6:F = ASCII_value 118

Case 1, Dual Key Add mode - Continuing with next digit position
Case 1, value 3: VK 3: 0 + OK 3: 6 = 6, then Xor with PT 7:G = ASCII_value 113

Case 2, Offset Key Add mode - Continuing with next digit position
Case 2, value 3: VK 3: 0 + VK 6 to-the-right: 4 = 4, then Xor with PT 8:H = ASCII_value 124

Case 3, Offset Key Add mode - Continuing with next digit position
Case 3, value 3: OK 3: 6 + OK0 to-the-right: 3 = 9, then Xor with PT 9:I = ASCII_value 112

Continue until all PT encrypted, yielding final Ciphertext: wdpvqlp

VKnext: F1246871218AC8478B4263883023788.435013356389933FF11EB98CBCCDCDDEDE, OKnext: 52FCA78646E6447801884659F40C322695FCA741FCCCA8A9BF046CB53E159E04
```

FIG 8

FAST UNBREAKABLE CIPHER

RELATED APPLICATIONS

This application claims priority to U.S. patent application Ser. No. 17/239,317 (now U.S. Pat. No. 11,711,364 issued Jul. 25, 2023) entitled "Fast Unbreakable Cipher filed Apr. 23, 2021 by the same inventor, which application is hereby incorporated by reference as if repeated herein in its entirety, including the drawings.

This application also claims priority to U.S. patent application Ser. No. 17/239,352 (now U.S. Pat. No. 11,711,365 issued Jul. 25, 2023) entitled "Integrated Circuit Performing Fast Unbreakable Cipher filed Apr. 23, 2021 by the same inventor, which application is hereby incorporated by reference as if repeated herein in its entirety, including the drawings.

U.S. patent application Ser. No. 17/239,317 claimed the benefit of U.S. Provisional Patent Application No. 63/028,203 filed May 21, 2020 entitled "Fast Unbreakable Cipher" by the same inventor, which is hereby incorporated by reference as if repeated herein in its entirety, including the drawings.

The present application is related to the following patents and patent applications:

U.S. patent application Ser. No. 08/879,708 filed Jun. 20, 1997 (now U.S. Pat. No. 6,058,189, which issued May 2, 2000) entitled "Method and System for Performing Secure Electronic Monetary Transactions;"

U.S. patent application Ser. No. 08/923,095 filed Sep. 4, 1997 (now U.S. Pat. No. 6,002,769, which issued Dec. 14, 1999) entitled "Method and System for Performing Secure Electronic Messaging," which claimed the benefit of U.S. patent application Ser. No. 08/879,708;

U.S. patent application Ser. No. 09/212,294 filed Dec. 16, 1998 (now U.S. Pat. No. 6,445,797, which issued Sep. 3, 2002) entitled "Method and System for Performing Secure Electronic Digital Streaming;"

U.S. patent application Ser. No. 10/062,312 filed Feb. 1, 2002 entitled "Method and System for Performing Perfectly Secure Key Exchange and Authenticated Messaging;"

U.S. Provisional Application No. 60/563,065 filed Apr. 16, 2004;

U.S. patent application Ser. No. 11/108,347 filed Apr. 18, 2005 entitled "Method and System for Performing Perfectly Secure Key Exchange and Authenticated Messaging," which claimed the benefit of U.S. patent application Ser. No. 10/062,312 and U.S. Provisional Application No. 60/563,065;

U.S. Provisional Application No. 60/842,595 entitled "Real Privacy Management Authentication System" filed Sep. 6, 2006;

U.S. patent application Ser. No. 11/850,948 filed Sep. 6, 2007 (now U.S. Pat. No. 7,899,185, which issued Mar. 1, 2011) entitled "Real privacy management authentication system," which application claimed the benefit of U.S. Provisional Application No. 60/842,595;

U.S. patent application Ser. No. 11/899,741 filed Sep. 6, 2007 (now U.S. Pat. No. 8,144,874), which issued Mar. 27, 2012 and is entitled "Method for Obtaining Key for use in Secure Communications over a Network and Apparatus for Providing Same," which application claimed the benefit of U.S. Provisional Application No. 60/842,595;

U.S. patent application Ser. No. 11/899,742 filed Sep. 6, 2007 (now U.S. Pat. No. 8,144,875), which issued Mar. 27, 2012 and is entitled "Method and System for Establishing Real-Time Authenticated and Secured Communications Channels in a Public Network," which application claimed the benefit of U.S. Provisional Application No. 60/842,595;

U.S. patent application Ser. No. 13/430,253 filed Mar. 26, 2012 (now U.S. Pat. No. 8,649,520), which issued Feb. 11, 2014 and is entitled "Method and System for Real-Time Trust in a Public Network," which application in turn claimed priority to U.S. patent application Ser. No. 11/899,742;

U.S. patent application Ser. No. 14/176,284 filed Feb. 10, 2014, entitled "Method and System for Authentication Over a Public Network Using Multiple Out-of-Band Communications Channels to Send Keys" (now U.S. Pat. No. 9,374,347 issued Jun. 21, 2016) which claimed priority to U.S. patent application Ser. No. 13/430,253;

U.S. Provisional Application No. 62/279,329 filed Jan. 15, 2016 entitled "Method and Apparatus for Streamlined Secure Credit Transaction;"

U.S. patent application Ser. No. 15/188,275 filed Jun. 21, 2016, entitled "Method and System for Authentication Over a Public Network Using Multiple Out-of-Band Communications Channels to Send Keys" (now U.S. Pat. No. 10,498,714 issued Dec. 3, 2019) which claimed priority to U.S. patent application Ser. No. 14/176,284;

U.S. Patent Application No. 62/532,095 filed Jul. 13, 2017, entitled "Method and Apparatus for Authentication and Encryption Service Employing Unbreakable Encryption;"

U.S. Patent Application No. 62/639,737 filed Mar. 7, 2018, entitled "Method and Apparatus for Credit Transaction Employing Unbreakable Encryption;"

U.S. Provisional Application No. 62/660,535 filed Apr. 20, 2018 entitled "Storage and Access Control Service Using Unbreakable Encryption;"

U.S. Provisional Application No. 62/680,897 filed Jun. 5, 2018 entitled "Credit Card Employing Unbreakable Encryption,"

U.S. patent application Ser. No. 16/035,123 (now U.S. Pat. No. 10,924,278 issued Feb. 16, 2021) filed Jul. 13, 2018, entitled "Method and Apparatus for Authentication and Encryption Service Employing Unbreakable Encryption" which claimed priority to U.S. Provisional Patent Application No. 62/532,095; and U.S. patent application Ser. No. 17/165,082 filed Feb. 2, 2021, entitled "Method and Apparatus for Authentication and Encryption Service Employing Unbreakable Encryption" which claimed priority to U.S. patent application Ser. No. 16/035,123;

U.S. patent application Ser. No. 16/295,560 filed Mar. 7, 2019, entitled "Method and Apparatus for Credit Transaction Employing Unbreakable Encryption" which claimed priority to U.S. Provisional Patent Application No. 62/639,737; and U.S. patent application Ser. No. 17/196,640 filed Mar. 9, 2021 entitled "Participant-Managed, Independent-Trust Authentication service for secure messaging, which claimed priority to U.S. Provisional Patent Application No. 63/028,203.

U.S. patent application Ser. No. 17/239,352 (now U.S. Pat. No. 11,711,365) filed concurrently herewith by the same inventor entitled "Integrated Circuit Performing Fast Unbreakable Cipher", which claims the benefit of U.S. Provisional Patent Application No. 63/028,203.

All of the foregoing patents and patent applications are hereby incorporated by reference, including the drawings, as if repeated herein in their entirety.

BACKGROUND

The present invention relates generally to methods and apparatuses for securing data, and more particularly to a method and apparatus for securing data that can operate in both hardware and software.

As we use the term herein, "Native Hardware Encryption" means embedded hardware security that treats all data exactly the same. The data flows through all of the same registers and is processed by the same instruction sets. There is no processing difference between open data (or unsecured data) and secure data (i.e., data that was or will be authenticated and encrypted). In Native Hardware Encryption open data and secure data is be processed identically. This means processed the same in the base computing capability, such as in the same CPU instruction set, ALU instructions, GPU, MPU (micro), etc. using the General Purpose Registers (GPRs). "Extensions" (such as Intel's SSE) where 'secure' data is handled differently than open data, while indeed on the chip, are not considered Native.

There are two fatal problems without Native Hardware Encryption. First, different handling introduces security vulnerabilities that can never be eliminated. Second, future networks will never have the required instant end-to-end security in their exponentially growing new connectivity. Such networks will continue to suffer todays from cyber-crime which exceeds $1 trillion.

The reason there are no native security capabilities is because every current authentication and encryption method is too complex to fit inside native processing, and too slow to be performed everywhere, end-to-end all the time.

The present invention is therefore directed to the problem of developing a method that authenticates and encrypts data which can be performed Native on a chip, i.e., Native Harware Encryption.

SUMMARY OF THE INVENTION

The present invention solves these and other problems by providing an authentication and encryption protocol that can be implemented within a single clock cycle of an integrated circuit chip while still providing unbreakable encryption. The protocol of the present invention is so small it can co-exist on any integrated circuit chip with other functions, including a general purpose central processing unit, general processing unit, or application specific integrated circuits with other communication related functionality.

The authentication and encryption protocol of the present invention, termed QwyitCipher™ (QCy™) employs primitives as outlined in the various patents incorporated by reference herein in a new and novel combination. These primitives include the following functions: MOD 16, Combine, Extract, PDAF and OWC functions. The configuration of the various primitives is the world's simplest, fastest most secure encryption engine. Given that it can be implemented in a single clock cycle for encryption or decryption, this protocol is as fast as it can ever be.

The authentication and encryption protocol of the present invention provides embedded authentication and encryption in a stream cipher for digital communications, assets and networks using a secret-key based system. Many stream cipher configurations can be built using different combinations of the Qwyit® primitives: MOD 16 and MOD 16D, Combine and Extract, PDAF and OWC. The exact definitions and inner workings of the functions are found in the aforementioned patents and patent applications. The new PDAF_SEC cipher function can be thought of as another Qwyit® primitive, as it is a single-step encryption function. The function and reference code are specified herein.

According to one aspect of the present invention, an apparatus for encrypting or decrypting data represented in packets can be implemented on an integrated circuit chip. This can be any type of chip, field programmable gate array (FPGA), application specific integrated circuit (ASIC), central processing unit (CPU) chip, or any other processing integrated circuit that can implement logic.

The integrated circuit will use inputs, such as pins, to receive input packets and will use outputs, e.g., pins, via which to output packets that have been either encrypted or decrypted. Other functions may occur between the inputs and outputs as well. Each packet has a predetermined bit length, such as 256 bits, 128 bits, 512 bits, 1024 bits. In general, the length need not be any of these values, but is easier to implement if divisible by two or four. The packet length will determine the length of the codewords for easier implementation, but the packet length could be shortened or lengthened prior to processing, if a different sized codeword was desired. As some of the embodiments of the present invention use symmetric operations, if the input consists of plaintext, then the output will be ciphertext, and of course, if the input consists of ciphertext, then the output will be plaintext. If a non-symmetrical function is used as the final operation of the codeword with the plaintext, then the encryption operation will be slightly different than the decryption operation, but this is not outside the scope of the present invention.

The logic gates of the integrated circuit are configured to implement certain instructions, which can be described in a higher level language, such as VHDL or Verilog. The higher level language is then converted by specific compilers in a known manner for the integrated circuit into a specific interconnection of gates to create the desired logic specified in the higher level language.

These instructions may include one or more of the following steps:

a) modular adding an open return, which is a random or pseudorandom number, and a first master key to obtain a value key pointer (Preferably, each of these has the same bit length, but it is possible to use values of different bit lengths);

b) modular adding the pseudorandom number and a second master key to obtain an offset key pointer;

c) performing a position digital algebraic function (PDAF) using the offset key pointer to point into the first master key to obtain a current value key (operation of the PDAF is described below);

d) performing a PDAF using the value key pointer to point into the second master key to obtain a current offset key;

e) modular adding the current value key with the current offset key and shifting them with respect to each other and repeating the modular adding to create a first plurality of message keys, each having said predetermined bit length;

f) performing a PDAF using the current offset key to point into the current value key, and shifting them with respect to each other and repeating the PDAF to create a second plurality of message keys, each having said predetermined bit length;

g) performing a PDAF using the current value key to point into the current offset key, and shifting them with respect to each other and repeating the PDAF to create a third plurality of message keys, each having said predetermined bit length;

h) performing an exclusive OR function with the first plurality of message keys and a first set of packets of the input to create a first set of packets of the output, each having said predetermined bit length;

i) performing an exclusive OR function with the second plurality of message keys and a second set of packets of the input to create a second set of packets of the output, each having said predetermined bit length; and j) performing an exclusive OR function with the third plurality of message keys and a third set of packets of the input to create a third set of packets of the output, each having said predetermined bit length.

The exemplary embodiment of the instructions may include one or more of the following steps:

k) performing a PDAF using the value key pointer to point into the current offset key to obtain next value key;

l) performing a PDAF using the offset key pointer to point into the current value key to obtain a next offset key; and m) replacing the current value key with the next value key and replacing the current offset key with the next offset key and repeating steps e) through j) for additional sets of input to create additional sets of output.

Alternatively, the exemplary embodiment of the instructions may include one or more of the following steps:

k) performing a PDAF using the value key pointer to point into the current offset key to obtain next value key;

l) performing a PDAF using the offset key pointer to point into the current value key to obtain a next offset key; and m) replacing the current value key with the next value key and replacing the current offset key with the next offset key and repeating steps e) through m) for additional sets of the input to create additional sets of the output.

Alternatively, the exemplary embodiment of the instructions may include storing the first master key and the second master key.

Alternatively, the exemplary embodiment of the instructions may include generating the pseudorandom number having the predetermined length.

According to another aspect of the present invention, an exemplary embodiment of an apparatus for encrypting or decrypting data includes a clock to output a clock signal having a plurality of clock cycles and a field programmable gate array being clocked by said clock signal.

The field programmable gate array is configured to perform the following:

a) modular add a pseudorandom number and a first master key to obtain a value key pointer;

b) modular add the pseudorandom number and a second master key to obtain an offset key pointer;

c) perform a position digital algebraic function using the offset key pointer to point into the first master key to obtain a current value key;

d) perform a position digital algebraic function using the value key pointer to point into the second master key to obtain a current offset key;

e) modular add the current value key with the current offset key and shifting them with respect to each other and repeating the modular adding to create a plurality of message keys; and f) either: (1) perform an exclusive OR function with the plurality of message keys and a plurality of plaintext to create a plurality of ciphertext; or (2) perform an exclusive OR function with the plurality of message keys and a plurality of ciphertext to create a plurality of plaintext.

According to another aspect of the present invention, the field programmable gate array may be configured to perform at least steps e) and f) in a single clock cycle for each message key created.

According to another aspect of the present invention, the field programmable gate array may be configured to:

g) perform a position digital algebraic function using the value key pointer to point into the current offset key to obtain next value key;

h) perform a position digital algebraic function using the offset key pointer to point into the current value key to obtain a next offset key; and i) replace the current value key with the next value key, replace the current offset key with the next offset key and repeat steps e) through f) to process additional plaintext or additional ciphertext.

Alternatively, according to another aspect of the present invention, the field programmable gate array may be configured to:

g) perform a position digital algebraic function using the value key pointer to point into the current offset key to obtain next value key;

h) perform a position digital algebraic function using the offset key pointer to point into the current value key to obtain a next offset key; and i) replace the current value key with the next value key, replace the current offset key with the next offset key and repeat steps e) through i) to process additional plaintext or additional ciphertext.

According to another aspect of the present invention, the field programmable gate array may be configured to have a memory in which to store the first master key and the second master key.

According to another aspect of the present invention, the field programmable gate array may be configured to generate the pseudorandom number having the predetermined length.

According to another aspect of the present invention, the field programmable gate array may be configured to:

g) perform a position digital algebraic function using the current offset key and the current value key, and shifting them with respect to each other and repeating the position digit algebraic function to create an additional plurality of message keys; and h) either: (1) perform an exclusive OR function with the additional plurality of message keys and an additional plurality of plaintext to create an additional plurality of ciphertext; or (2) perform an exclusive OR function with the additional plurality of message keys and an additional plurality of ciphertext to create an additional plurality of plaintext.

According to another aspect of the present invention, the field programmable gate array may be configured to:

i) perform a position digital algebraic function using the value key pointer to point into the current offset key to obtain next value key;

j) perform a position digital algebraic function using the offset key pointer to point into the current value key to obtain a next offset key; and k) replace the current value key with the next value key, replace the current offset key with the next offset key and repeat steps e) through h) to process additional plaintext or additional ciphertext.

According to another aspect of the present invention, an apparatus for encrypting or decrypting data includes a processor and a memory. The processor receives data represented in a plurality of packets, said data being either ciphertext or plaintext, each packet having a predetermined bit length, said processor to output a plurality of ciphertext packets upon receipt of a plurality of plaintext packets and to output a plurality of plaintext packets upon receipt of a plurality of ciphertext packets. The memory stores computer readable instructions causing the processor to:
    a) modular add a pseudorandom number and a first master key to obtain a value key pointer;
    b) modular add the pseudorandom number and a second master key to obtain an offset key pointer;
    c) perform a position digital algebraic function using the offset key pointer to point into the first master key to obtain a current value key;
    d) perform a position digital algebraic function using the value key pointer to point into the second master key to obtain a current offset key;
    e) perform a position digital algebraic function using the current offset key and the current value key, and shifting them with respect to each other and repeating the position digit algebraic function to create a plurality of message keys; and
    f) perform an exclusive OR function with the plurality of message keys and either a plurality of plaintext packets to create a plurality of ciphertext packets or a plurality of ciphertext packets to create a plurality of plaintext packets.

Additionally, the computer readable instructions may further cause the processor to:
    g) performing a position digital algebraic function using the value key pointer to point into the current offset key to obtain next value key;
    h) performing a position digital algebraic function using the offset key pointer to point into the current value key to obtain a next offset key; and
    i) replacing the current value key with the next value key and replacing the current offset key with the next offset key and repeating steps e) through f) to process any additional packets.

Alternatively, the computer readable instructions may further cause the processor to:
    g) performing a position digital algebraic function using the value key pointer to point into the current offset key to obtain next value key;
    h) performing a position digital algebraic function using the offset key pointer to point into the current value key to obtain a next offset key; and
    i) replacing the current value key with the next value key and replacing the current offset key with the next offset key and repeating steps e) through i) to process any additional packets.

Additionally, the computer readable instructions may further cause the processor to store the first master key and the second master key.

Additionally, the computer readable instructions may further cause the processor to generate the pseudorandom number.

According to yet another aspect of the present invention, an apparatus for encrypting or decrypting data employs a clock and a field programmable gate array. The clock outputs a clock signal having a plurality of clock cycles. The field programmable gate array is clocked by said clock signal. The field programmable gate array is configured to operate as follows:
    a) during a first clock cycle of the plurality of clock cycles:
    (i) modular add a pseudorandom number and a first master key to obtain a value key pointer;
    (ii) modular add the pseudorandom number and a second master key to obtain an offset key pointer;
    (iii) perform a position digital algebraic function using the offset key pointer to point into the first master key to obtain a current value key;
    (iv) perform a position digital algebraic function using the value key pointer to point into the second master key to obtain a current offset key;
    (v) modular add the current value key with the current offset key to create a first message key; and
    (vi) either: (1) perform an exclusive OR function with the first message key and a first plaintext packet to create a first ciphertext packet; or (2) perform an exclusive OR function with the first message key and a first ciphertext packet to create a first plaintext packet;
    b) for any additional data, during one clock cycle:
    (i) shift the current value key and the current offset key with respect to each other, followed by a modular add to create another first message key; and
    (ii) either: (1) perform an exclusive OR function with said another first message key and another first plaintext packet to create another first ciphertext packet; or (2) perform an exclusive OR function with said another first message key and another first ciphertext packet to create another first plaintext packet;
    c) for any additional data, repeat step b) using one clock cycle for each repetition until all possible shifted combinations of the current value key and the current offset key have been modular added;
    d) for any additional data, during one clock cycle:
    (i) perform a position digital algebraic function using the current offset key to point into the current value key to create a second message key; and
    (ii) either: (1) perform an exclusive OR function with said second message key and a second plaintext packet to create a second ciphertext packet; or (2) perform an exclusive OR function with said second message key and a second ciphertext packet to create a second plaintext packet;
    e) for any additional data, during one clock cycle:
    (i) shift the current value key and the current offset key with respect to each other, followed by a position digital algebraic function using the current offset key to point into the current value key to create another second message key; and
    (ii) either: (1) perform an exclusive OR function with said another second message key and another second plaintext packet to create another second ciphertext packet; or (2) perform an exclusive OR function with said another second message key and another second ciphertext packet to create another second plaintext packet;
    f) for any additional data, repeat step e) using one clock cycle for each repetition until all possible shifted combinations of the current value key and the current offset key have been used in the position digital algebraic function;
    g) for any additional data, during one clock cycle:
    (i) perform a position digital algebraic function using the current value key to point into the current offset key to create a third message key; and
    (ii) either: (1) perform an exclusive OR function with said third message key and a third plaintext packet to create a third ciphertext packet; or (2) perform an exclusive OR function with said third message key and a third ciphertext packet to create a third plaintext packet;

h) for any additional data, during one clock cycle:
  (i) shift the current value key and the current offset key with respect to each other, followed by a position digital algebraic function using the current value key to point into the current offset key to create another third message key; and
  (ii) either: (1) perform an exclusive OR function with said another third message key and another third plaintext packet to create another third ciphertext packet; or (2) perform an exclusive OR function with said another third message key and another third ciphertext packet to create another third plaintext packet; and
i) for any additional data, repeat step h) using one clock cycle for each repetition until all possible shifted combinations of the current value key and the current offset key have been used in the position digital algebraic function.

The field programmable gate array may be further configured to operate as:
j) for any additional data, during a one clock cycle:
  (i) perform a position digital algebraic function using the value key pointer to point into the current offset key to obtain a next value key;
  (ii) perform a position digital algebraic function using the offset key pointer to point into the current value key to obtain a next offset key; and
  (iii) replace the current value key with the next value key;
  (iv) replace the current offset key with the next offset key; and
  (v) repeat substep (v) and substep (vi) in step a); and
for additional data, continue from step b) through j) and repeating continuously until all data is processed.

According to yet another aspect of the present invention, an exemplary embodiment of a method for performing symmetrical encryption or decryption of data represented in a plurality of input packets may include some or all of the following steps:
  a) modular adding a pseudorandom number and a first master key to obtain a value key pointer;
  b) modular adding the pseudorandom number and a second master key to obtain an offset key pointer;
  c) calculating a first position digital algebraic function using the offset key pointer to point into the first master key to obtain a current value key;
  d) calculating a second position digital algebraic function using the value key pointer to point into the second master key to obtain a current offset key;
  e) modular adding the current value key with the current offset key and shifting them with respect to each other and repeating the modular adding to create a first plurality of message keys, each having said predetermined bit length;
  f) calculating a third position digital algebraic function using the current offset key to point into the current value key, and shifting them with respect to each other and repeating the calculation of the third position digit algebraic function to create a second plurality of message keys, each having said predetermined bit length;
  g) calculating a fourth position digital algebraic function using the current value key to point into the current offset key, and shifting them with respect to each other and repeating the calculation of the fourth position digit algebraic function to create a third plurality of message keys, each having said predetermined bit length;
  h) performing an exclusive OR function with the first plurality of message keys and a first set of packets of the plurality of input packets to create a first set of packets of a plurality of output packets, each having said predetermined bit length;
  i) performing an exclusive OR function with the second plurality of message keys and a second set of packets of the plurality of input packets to create a second set of packets of the plurality of output packets, each having said predetermined bit length; and
  j) performing an exclusive OR function with the third plurality of message keys and a third set of packets of the plurality of input packets to create a third set of packets of the plurality of output packets, each having said predetermined bit length.

According to still another aspect of the present invention, the above exemplary embodiment may include at least the following steps:
  k) calculating a fifth position digital algebraic function using the value key pointer to point into the current offset key to obtain next value key;
  l) calculating a sixth position digital algebraic function using the offset key pointer to point into the current value key to obtain a next offset key; and
  m) replacing the current value key with the next value key and replacing the current offset key with the next offset key and repeating steps e) through j) for additional sets of the plurality of input packets to create additional sets of the plurality of output packets.

According to still another aspect of the present invention, the above exemplary embodiment may include at least the following steps:
  k) calculating a fifth position digital algebraic function using the value key pointer to point into the current offset key to obtain next value key;
  l) calculating a sixth position digital algebraic function using the offset key pointer to point into the current value key to obtain a next offset key; and
  m) replacing the current value key with the next value key and replacing the current offset key with the next offset key and repeating steps e) through m) for additional sets of the plurality of input packets to create additional sets of the plurality of output packets.

According to still another aspect of the present invention, the above exemplary embodiment may include at least storing the first master key and the second master key.

According to still another aspect of the present invention, the above exemplary embodiment may include at least generating the pseudorandom number having the predetermined length.

According to yet another aspect of the present invention, an exemplary embodiment of a method for encrypting or decrypting data in an integrated circuit chip may include some or all of the following steps:
  a) clocking the integrated circuit chip with a plurality of clock cycles;
  b) modular adding a pseudorandom number and a first master key to obtain a value key pointer;
  c) modular adding the pseudorandom number and a second master key to obtain an offset key pointer;
  d) performing a first position digital algebraic function using the offset key pointer to point into the first master key to obtain a current value key;
  e) performing a second position digital algebraic function using the value key pointer to point into the second master key to obtain a current offset key;
  f) modular adding the current value key with the current offset key and shifting them with respect to each other and repeating the modular adding to create a plurality of message keys; and g) either: (1) performing an exclusive OR function with the plurality of message keys and a plurality of plaintext to create a plurality of ciphertext; or (2) perform an exclusive OR function with the plurality of message keys and a plurality of ciphertext to create a plurality of plaintext.

According to still another aspect of the present invention, the above exemplary embodiment may include performing at least steps f) and g) in a single clock cycle for each message key created.

According to still another aspect of the present invention, the above exemplary

- h) performing a third position digital algebraic function using the value key pointer to point into the current offset key to obtain next value key;
- i) performing a fourth position digital algebraic function using the offset key pointer to point into the current value key to obtain a next offset key; and
- j) replacing the current value key with the next value key, replacing the current offset key with the next offset key and repeating steps f) through g) to process additional plaintext or additional ciphertext.

According to still another aspect of the present invention, the above exemplary embodiment may include:

- h) performing a third position digital algebraic function using the value key pointer to point into the current offset key to obtain next value key;
- i) performing a fourth position digital algebraic function using the offset key pointer to point into the current value key to obtain a next offset key; and
- j) replacing the current value key with the next value key, replacing the current offset key with the next offset key and repeating steps f) through j) to process additional plaintext or additional ciphertext.

According to still another aspect of the present invention, the above exemplary embodiment may include storing the first master key and the second master key in said memory.

According to still another aspect of the present invention, the above exemplary embodiment may include generating the pseudorandom number having the predetermined length.

According to still another aspect of the present invention, the above exemplary

- h) calculating a third position digital algebraic function using the current offset key and the current value key, and shifting them with respect to each other and repeating the calculating of the third position digit algebraic function to create an additional plurality of message keys; and
- i) either: (1) perform an exclusive OR function with the additional plurality of message keys and an additional plurality of plaintext to create an additional plurality of ciphertext; or (2) perform an exclusive OR function with the additional plurality of message keys and an additional plurality of ciphertext to create an additional plurality of plaintext.

According to still another aspect of the present invention, the above exemplary embodiment may include:

- j) calculating a fourth position digital algebraic function using the value key pointer to point into the current offset key to obtain next value key;
- k) calculating a fifth position digital algebraic function using the offset key pointer to point into the current value key to obtain a next offset key; and
- l) replacing the current value key with the next value key, replacing the current offset key with the next offset key and repeating steps f) through i) to process additional plaintext or additional ciphertext.

According to yet another aspect of the present invention, an exemplary embodiment of a method for encrypting or decrypting data in an integrated circuit chip may include some or all of the following steps:

- a) modular adding a pseudorandom number and a first master key to obtain a value key pointer;
- b) modular adding the pseudorandom number and a second master key to obtain an offset key pointer;
- c) calculating a first position digital algebraic function using the offset key pointer to point into the first master key to obtain a current value key;
- d) calculating a second position digital algebraic function using the value key pointer to point into the second master key to obtain a current offset key;
- e) calculating a third position digital algebraic function using the current offset key and the current value key, and shifting them with respect to each other and repeating the calculating of the third position digit algebraic function to create a plurality of message keys; and
- f) calculating an exclusive OR function with the plurality of message keys and either a plurality of plaintext packets to create a plurality of ciphertext packets or a plurality of ciphertext packets to create a plurality of plaintext packets.

According to still another aspect of the present invention, the above exemplary embodiment may include:

- g) calculating a fourth position digital algebraic function using the value key pointer to point into the current offset key to obtain next value key;
- h) calculating a fifth position digital algebraic function using the offset key pointer to point into the current value key to obtain a next offset key; and
- i) replacing the current value key with the next value key and replacing the current offset key with the next offset key and repeating steps e) through f) to process any additional packets.

According to still another aspect of the present invention, the above exemplary

- g) calculating a fourth position digital algebraic function using the value key pointer to point into the current offset key to obtain next value key;
- h) calculating a fifth position digital algebraic function using the offset key pointer to point into the current value key to obtain a next offset key; and
- i) replacing the current value key with the next value key and replacing the current offset key with the next offset key and repeating steps e) through i) to process any additional packets.

According to still another aspect of the present invention, the above exemplary embodiment may include storing the first master key and the second master key.

According to still another aspect of the present invention, the above exemplary embodiment may include generating the pseudorandom number.

According to yet another aspect of the present invention, an exemplary embodiment of a method for encrypting or decrypting data in an integrated circuit chip may include some or all of the following steps:

clocking an integrated circuit being by a clock signal having a plurality of clock cycles;

- a) during a first clock cycle of the plurality of clock cycles:
  - (i) modular adding a pseudorandom number and a first master key to obtain a value key pointer;
  - (ii) modular adding the pseudorandom number and a second master key to obtain an offset key pointer;

(iii) calculating a first position digital algebraic function using the offset key pointer to point into the first master key to obtain a current value key;
(iv) calculating a second position digital algebraic function using the value key pointer to point into the second master key to obtain a current offset key;
(v) modular adding the current value key with the current offset key to create a first message key; and
(vi) either: (1) performing an exclusive OR function with the first message key and a first plaintext packet to create a first ciphertext packet; or (2) performing an exclusive OR function with the first message key and a first ciphertext packet to create a first plaintext packet;

b) for any additional data, during one clock cycle:
(i) shifting the current value key and the current offset key with respect to each other, followed by a modular adding to create another first message key; and
(ii) either: (1) performing an exclusive OR function with said another first message key and another first plaintext packet to create another first ciphertext packet; or (2) perform an exclusive OR function with said another first message key and another first ciphertext packet to create another first plaintext packet;

c) for any additional data, repeating step b) using one clock cycle for each repetition until all possible shifted combinations of the current value key and the current offset key have been modular added;

d) for any additional data, during one clock cycle:
(i) calculating a third position digital algebraic function using the current offset key to point into the current value key to create a second message key; and
(ii) either: (1) performing an exclusive OR function with said second message key and a second plaintext packet to create a second ciphertext packet; or (2) performing an exclusive OR function with said second message key and a second ciphertext packet to create a second plaintext packet;

e) for any additional data, during one clock cycle:
(i) shifting the current value key and the current offset key with respect to each other, followed by a fourth position digital algebraic function calculation using the current offset key to point into the current value key to create another second message key; and
(ii) either: (1) performing an exclusive OR function with said another second message key and another second plaintext packet to create another second ciphertext packet; or (2) performing an exclusive OR function with said another second message key and another second ciphertext packet to create another second plaintext packet;

f) for any additional data, repeat step e) using one clock cycle for each repetition until all possible shifted combinations of the current value key and the current offset key have been used in the fourth position digital algebraic function;

g) for any additional data, during one clock cycle:
(i) performing a fifth position digital algebraic function calculation using the current value key to point into the current offset key to create a third message key; and
(ii) either: (1) performing an exclusive OR function with said third message key and a third plaintext packet to create a third ciphertext packet; or (2) performing an exclusive OR function with said third message key and a third ciphertext packet to create a third plaintext packet;

h) for any additional data, during one clock cycle:
(i) shifting the current value key and the current offset key with respect to each other, followed by a sixth position digital algebraic function calculation using the current value key to point into the current offset key to create another third message key; and
(ii) either: (1) performing an exclusive OR function with said another third message key and another third plaintext packet to create another third ciphertext packet; or (2) performing an exclusive OR function with said another third message key and another third ciphertext packet to create another third plaintext packet; and i) for any additional data, repeat step h) using one clock cycle for each repetition until all possible shifted combinations of the current value key and the current offset key have been used in the sixth position digital algebraic function calculation.

According to still another aspect of the present invention, the above exemplary embodiment may include:
j) for any additional data, during a one clock cycle:
(i) performing a first position digital algebraic function calculation using the value key pointer to point into the current offset key to obtain a next value key;
(ii) performing a second position digital algebraic function using the offset key pointer to point into the current value key to obtain a next offset key; and
(iii) replacing the current value key with the next value key;
(iv) replacing the current offset key with the next offset key; and
(v) repeating substep (v) and substep (vi) in step a); and for additional data, continue from step b) through j) and repeating continuously until all data is processed.

The aforementioned exemplary embodiments may be combined in various ways without departing from the scope of the present invention.

BRIEF DESCRIPTION OF THE DRAWINGS

FIG. 1 depicts an analysis of the security of an exemplary embodiment of an authentication and encryption protocol of the present invention according to one aspect of the present invention.

FIG. 2 depicts an exemplary embodiment of an authentication and encryption protocol of the present invention according to another aspect of the present invention.

FIG. 3 depicts a flow diagram of an exemplary embodiment of an authentication and encryption protocol of the present invention according to another aspect of the present invention.

FIG. 4 depicts three different equations for generating the code word used in an exemplary embodiment of an authentication and encryption protocol of the present invention according to another aspect of the present invention.

FIG. 5 depicts a chart showing the PDAF random rearrangement uniqueness which is used in an exemplary embodiment of an authentication and encryption protocol of the present invention according to another aspect of the present invention.

FIGS. 6-8 depict the test results for identical message decryptions from different plain texts for an exemplary embodiment of an authentication and encryption protocol of the present invention according to another aspect of the present invention.

DETAILED DESCRIPTION

Exemplary Embodiment

Figure 6:
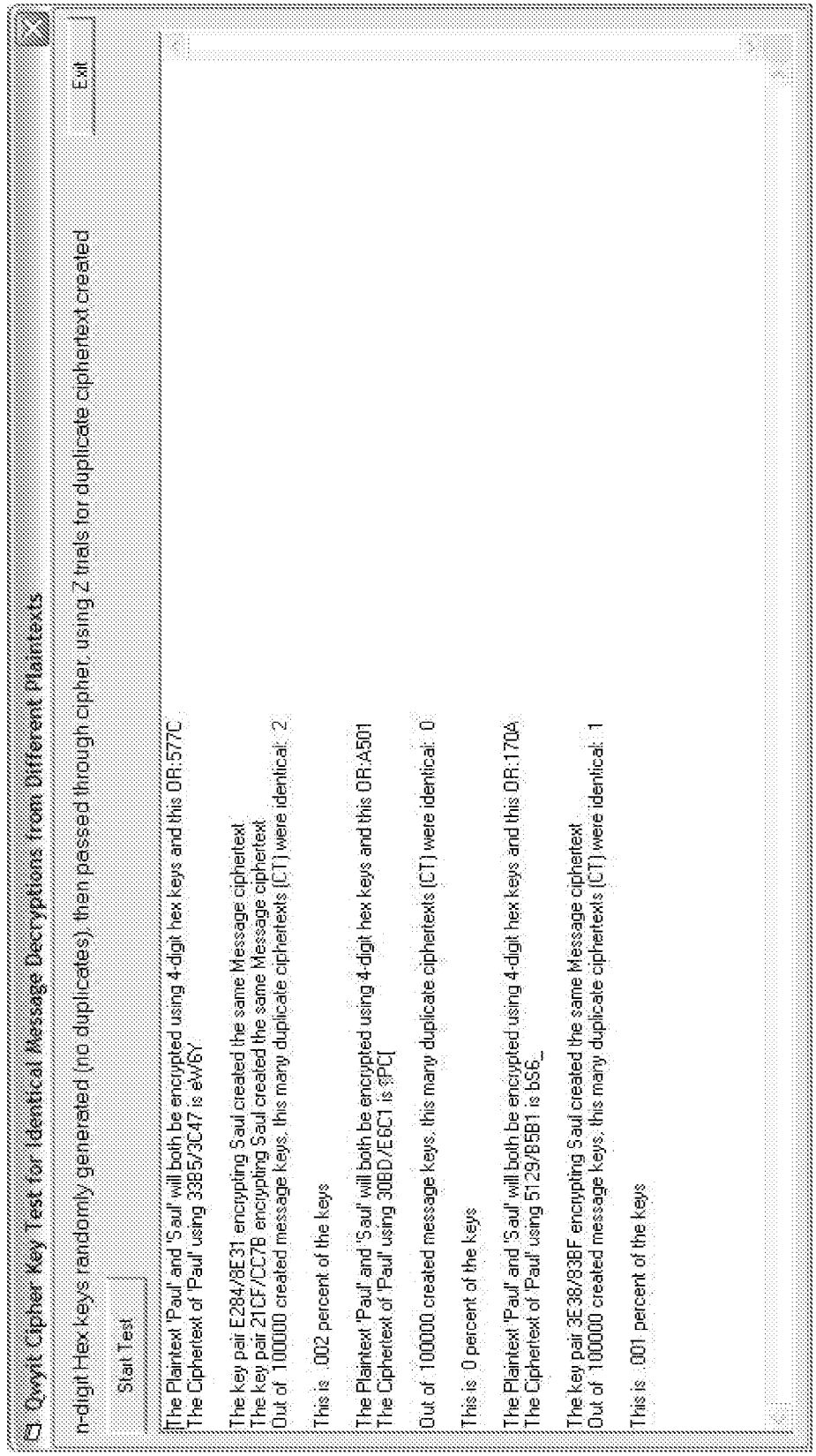

The authentication and encryption protocols of the present invention described herein are presented as real world solutions to the fundamental flaws and lack of universal, easy-to-use and properly applicable privacy and security in digital communications, storage and not-present transactions.

Instead of the minutiae of cryptographic math proofs that attempt to categorize authentication and data security methods—because this does absolutely nothing to help digital architects, owners and users understand, properly apply and implement them—there is a straightforward engineering check for a provably secure methodology: the Perfect Security Cross test. This is a form of complete cryptoanalysis—if an algorithm provides all four barriers in the cross, the algorithm is Perfectly Secret.

That term, Perfect Secrecy, has been applied by cryptography beginning with Shannon's 1949 landmark paper in which the defined and provided mathematic proof that such a thing can be only one thing. The problem with current cryptography, is the rest of Shannon's paper has been unheeded. Here are two crucial direct quotes about proving security:

It is difficult to define the pertinent ideas involved with sufficient precision to obtain results in the form of mathematical theorems, but it is believed that the conclusions, in the form of general principles, are correct.

This quote is from Shannon's *Communication Theory of Secrecy Systems**, near the end of Part III *Practical Secrecy*, Section 21 *The Work Characteristic*, where he's about to embark on discussion in solving this question that he just proposed:

How can we ever be sure that a system which is not ideal and therefore has a unique solution for sufficiently large N will require a large amount of work to break with every method of analysis?

The italics are his, and they emphasize that for cryptographic solutions that are "not ideal", he is asking, and pointing out, that one cannot really prove that these non-ideal systems always work. What he is talking about—cryptosystems that are not "ideal"—these are every single one of today's cryptographic algorithms!

What happened in cryptography with "Ideal Systems"? Everyone today is well versed in his Perfect Secrecy, the proof, and the definition (short version): Key as long as the message. And only that. But . . . Shannon actually stated—and detailed—another definition of a provably secure system (our underlining, his italics):

It is possible to construct secrecy systems with a finite key for certain "languages" in which the equivocation does not approach zero as N→∞. In this case, no matter how much material is intercepted, the enemy still does not obtain a unique solution to the cipher but is left with many alternatives, all of reasonable probability. Such systems we call ideal systems. It is possible in any language to approximate such behavior—i.e., to make the approach to zero of H(N) recede out to arbitrarily large N. However, such systems have a number of drawbacks, such as complexity and sensitivity to errors in transmission of the cryptogram.

In that last sentence, as Shannon goes on to construct an example Ideal System, he notes the difficulty; but his focus was on 1949 'networks', which were only text and languages. Computing, bits and digital 'languages' were a decade away. So, his "complexity" revolved around them; and he ended his Part II, Theoretical Secrecy section stating:

Ideal secrecy systems suffer from a number of disadvantages.

Then, off he went to Part III where we started above, the non-ideal systems, and . . . that is where every single cryptographer since has been focused (stuck, really.) And what a shame the industry has wasted 70+ years working in the wrong chapter.

The result?

End-to-end Security is not achievable because the security systems are not.

Constant attempts to 'balance' Security vs Performance, when we should have them both.

Systems that no one understands—developers, operators, and users.

Our Status Quo 'Best Practices' give up $6 trillion yearly in cybercrime.

The missing ingredient in all of these is that there has not been any properly applied engineering of Perfect Secrecy cryptography into real world network solutions to realize Shannon's IDEAL SYSTEM.

Everyone has been working in the wrong chapter but us: we picked right up where Shannon left off, and we designed, built and tested a Perfect Secrecy Ideal System. The encryption engine of the present invention described herein incorporates significant engineering innovations and delivers the world's fastest, most efficient, most secure digital data cipher ever! The encryption engine of the present invention is built with simple revolutionary cryptographic primitives that provide a true perfectly secure, endless key, Authentic Encryption cipher. The encryption cipher, termed PDAF_SEC, implemented herein meets the key requirement of Perfectly Secure new key bit per plaintext bit and delivers the ultimate solution to the Perfect Security Cross, see FIG. 1.

Cryptography has misapplied the term 'Authenticated Encryption' such that Qwyit® is forced to 'invent' a new term Authentic Encryption—which is exactly what one thinks 'Authenticated Encryption' means (but does not): Encryption that is Authentic, from the source who owns the encryption keys; e.g., the digital communication method of authentication has been combined with the method of hiding the data (encryption). We will now call this 'Authentic Encryption'.

'Authenticated Encryption' is misnamed by cryptographers to mean encryption that has not been corrupted, e.g., has been received with proper message integrity, which is what authenticity means (not authentication). They should have called that either 'Authenticity Encryption' or 'Integrity Encryption'—not 'Authenticated'. But now we have a method that actually meets what people think—and need—when they use Authentic Encryption.

The present invention provides an authentic encryption protocol that creates Shannon's Perfect Secrecy Ideal System and delivers Perfect Cross Security as described above. Referring to FIG. 1, shown therein is the Perfect Security Cross as applied to the authentic encryption protocol of present invention. Perfect Secrecy is 'susceptible' to a known plaintext 'attack'. The reason those are in quotes, is because Perfect Secrecy never reveals the contents—but, it may be used in situations where there is positively known plaintext (greetings, etc.) When this is the case, the message key used for that will be revealed (not broken). Since in true Perfect Secrecy all other message bits are unique and unbreakable, it is incumbent on our shorter-than-the-plaintext method (Ideal System) for it to remain Perfectly Secret, never leading to breaking/revealing any unknown remaining parts of the message as well as the other three arms of the cross.

PDAF_SEC Overview (see FIG. 2)

The Qwyit® Authentication and Data Security protocol includes a unique and property-filled function called the Position Digit Algebra Function (PDAF). The PDAF of the present invention uses two inputs, X and Y. The output Z is determined by modular summing two inputs of X where one of the inputs of X is determined by the value of Y. For example, let:

$$X_n = x_1 x_2 x_3 \ldots x_n$$

$$Y_n = y_1 y_2 y_3 \ldots y_n$$

$$Z_n = z_1 z_2 z_3 \ldots z_n$$

Then, $z_1 = x_1 + x_i$ where $x_i = f(y_i)$. In one embodiment, the value of $y_i$ determines the value of $x_i$ by counting the number digits from $x_i$ until reaching the $i^{th}$ digit from $x_1$ where $i = y_1 + 1$, such that if $y_1 = 0$, then $x_i$ $x_1$ and if $y_1 = 1$, then $x_i$ $x_2$ and so on. Essentially, the value of Y points into the input X to determine which two values of X are modular summed to create each value of Z.

To use the function as a simple, one-step underdetermined cipher, the PDAF becomes the PDAF_SEC function by minimally adding to it to include performing the one-step simple XOR of the PDAF result with the TargetText, either plaintext to be encrypted or ciphertext to be decrypted.

The process of the PDAF_SEC requires, ideally, two input n-bit (e.g., 256 bits, but this could be any length preferably divisible by eight) key values (or one that will function as both keys—not recommended as this reduces the initial key space)—calling one the ValueKey (VK) and the other the OffsetKey (OK). An OpenReturn (OR), which is a same-bit-sized public Initialization Vector (also known as a pseudorandom number), is also included; as well as either the plaintext (PT) to be encrypted or the ciphertext (CT) to be decrypted. Both keys should be the same number of bits (digits)—although this is not required (the function can be written to accommodate short pointing keys that are concatenated to meet the return requirements, although this is not recommended).

Initialization Step:

The process begins by modular (MOD) adding the OR and the Authentication Key QK to create a unique starting ValueKey pointer $VK^P$. Then the process performs a PDAF function of that pointer $VK^P$ with the Authentication key EK.

This creates an underdetermined starting ValueKey that even if it were discovered or stolen will not leak the Master system Authentication Keys. The Master Authentication Keys should be stored/managed separately from the calculated encryption keys.

The process creates the starting OffsetKey in the same manner, by MOD 16 adding the OR and the Authentication Key EK to create a unique starting OffsetKey pointer $OK^P$, then performs a PDAF function of that pointer $OK^P$ with the Authentication key QK Because process of the present invention is designed to be one-step, extremely flexible for implementation everywhere, the key lengths can be any size. There are no block requirements, no restrictions on size. Recommendation is for an even number of bits for simplicity.

Step 1:

The process sets pointers at digit position 1 in each key (Po in the OK, and Pv in the VK). The process takes the value at Pv and MOD 16 adds it to the digit in the Po position. E.g., if the VK is "19B3AD2" and the OK is "C0FF48C", the first PDAF result is 1+C=D where the 1 is from the Pv at position one, and the C is selected from the Po in the OK. These results in total form the Message Key, W. See FIG. 4 and the Selection Options section for additional ways to perform the PDAF on VK/OK. All of the methods produce underdetermined message keys.

Step 2:

Take the PDAF add result (W) and XOR it with the TargetText (PT or CT) first 'value'. E.g., if the TargetText is PT="This is a test!", the PDAF select add result of D is XOR'd with "T". The TargetText can be 'value' sliced any way, in 4- or 8-bit 'values', etc.; as long as the XOR of key bit and TargetText bit is performed uniquely and non-repetitively.

Move both pointers one position to the right. A complete cycle is from 1 . . . n digits in the VK and OK.

Repeat for More Data

If there is more TargetText remaining at the end of the cycle (denoted by pointer Pc), increment Pc by one, move the Pv pointer one digit position to the right of its last cycle start (e.g., the $2^{nd}$ cycle will start at digit position 2, $3^{rd}$ cycle at position 3, etc.), and perform another same select add/cipher XOR cycle where the Po always starts at the first OK position.

There will be Length (VK) squared cycles in total. E.g., a 256-bit key, containing 64 4-bit hex values, will have $64^2$ (4,096) returned PDAF_SEC 4-bit digit results. This is for each Selection Cycle Case noted below; using all three Selection Cycle Cases will yield $64^2 \times 3$ (12,288) returned PDAF_SEC 4-bit digit results.

The most optimal method for performing these calculations depends on the format of the data in the specific software language or hardware design markup language being used to keep the number of extra steps at a minimum. For example, Java uses 8-bits to describe a number, but one of the bits is a sign bit, whereas C does not use a sign bit. Additionally, multiple reads may be required to perform certain functions in software, whereas in hardware languages, such as Verilog or VHDL, the entire 256-bit value can be processed in a single step. Therefore, the optimal design must consider these factors when designing the actual implementation in a given language and environment.

Key Update

If there is more TargetText remaining at the end of all cycles (a complete cycle set), update the VK and OK, reset the Pv and Po to the $1^{st}$ position and continue as above until the end of the plaintext/ciphertext (at the end of each cycle set, continue updating/cycling until PT/CT is exhausted).

The update must reconfigure both the VK and OK such that there is a mathematic one-way gate 'across' the cycling resets. If it is possible to write a single, continuing equation where $VK^{New}$ and $OK^{New}$ are known extensions of $VK^{Start}$ and $OK^{Start}$, then any positively known (impossibly broken, but possibly known) Plaintext would result in the continued ability to derive W and realize the correct message content (the key values wouldn't necessarily be known if they are combined in some fashion, but their result would be).

In the protocol of the present invention, QCy™, the one-way gate is the Qwyit® PDAF function. It provides a one-way linear MOD 16 across digit positions, by mixing/adding different positions of both keys pointing 'into' each other as dictated by the values in the keys. We will describe this in more detail later (function definition and two operating modes (Offset Key Add and Dual Key Add)).

In order to quickly reconfigure both keys, perform a PDAF using VK to point into OK to update VK and another PDAF using the OK to point into VK to update OK. This reconfiguration provides the Random Rearrangement property of maintaining a new, unique key bit for every plaintext bit.

Later we describe in more detail a complete Random Rearrangement definition and security explanation of this innovative cryptographic function.

Then continue the next cycle set with the reconfigured keys.

This Update Method, Random Rearrangement value mixing, creates a never-ending series of new keys that are distinctly unique, always maintaining their random entropy and that create the required endless, never-repeating child message keys for encryption. This property of Random Rearrangement delivers a true Ideal System.

FIG. 2 depicts an exemplary embodiment of the PDAF_SEC Cipher. The PDAF_SEC's process of underdetermined linear equations includes:

Qwyit® ID: OpenID [This is the public Qwyit® Community ID]
Qwyit® Keys: EK, QK [These are the upper level Qwyit® Authentication Keys]
Initialization Vector: OR [A randomly generated public Initialization Vector].

The Encryption/Decryption Session starts by determining the starting ValueKey and OffsetKey, which are determined from:

QK MOD 16 OR=$VK^P$ then PDAF(EK, $VK^P$)=$VK^C$ [Starting ValueKey]
EK MOD 16 OR=$OK^P$ then PDAF(QK, $OK^P$)=$OK^C$ [Starting OffsetKey].

While a MOD 16 is shown, the actual base of the modular function is not limited to 16 but could be other values, depending on the implementation requirements.

The Selection process includes:
$VK^{Pc[1...n]}_{Pv[1...n]}$ MOD 16 $OK_{Po[1...n]}$=$W_{1...n}^2$ Where pointer Pv and Po increment +1 through the key length for each cycle pointer Pc [This is a PDAF in Dual Key ADD mode as described in FIG. 4.]

If repeating, substitute $VK^N$ and $OK^N$ for each new cycle

The Cipher process is as follows:
$W_{1...n}^2 \oplus PT_{1...m}^2 = CT_{1...n}^2$ repeating w/next cycle selection if more PT.

The Update process is as follows (if more PT):
Update ValueKey: PDAF($OK^C$, $VK^P$)=$VK^{Next}$
Update OffsetKey: PDAF($VK^C$, $OK^P$)=$OK^{Next}$
Where the PDAF performed is the Key Offset Add mode
The Repeat Process for as long as there is data:
Cycle through Selection, Cipher, Updates, replacing VK and OK until PT, CT completed.

Finally, Send Process includes:
Per Message[OpenID, OR, CT] to the OpenID location of intended recipient.

QCy™ PDAF_SEC Selection Options

The Perfect Secrecy provided by the cipher of the present invention is detailed; the irrefutable mathematic foundation for this security is that cipher is underdetermined at every step. In that regard, there are additional options for the Selection step. This step provides the endless key values using a PDAF mode—either an Offset Key Add Mode or the Dual Key Add Mode. The default case shown above, uses the PDAF Dual Key Add Mode. Any of these can be used, in any combination, as they all remain underdetermined and provide unique results. The choice can be made based on performance, code space, code specific limitations, etc. These additional Selection Case methods are shown in FIG. 4.

| Case | General Equation* | Description |
|------|-------------------|-------------|
| 1 | $VK^1$ mod $OK^1$ = $W^1$ | Default: DUAL KEY ADD MODE, ValueKey plus OffsetKey, starting at digit 1 of each and adding that position. Continue until all digits have been added to each other |
| 2 | $VK^1$ mod $VK^X$ = $W^1$ | OFFSET KEY ADD MODE, ValueKey plus OffsetKey into ValueKey, starting at digit 'one to the right' = zeroth digit PDAF($VK^C$, $OK^C$) |
| 3 | $OK^1$ mod $OK^X$ = $W^1$ | OFFSET KEY ADD MODE, OffsetKey plus ValueKey into OffsetKey, starting at digit 'one to the right' = zeroth digit PDAF($OK^C$, $VK^C$) |

*NOTE:
These cycle through as indicated in the default description above - these represent the first W created.

Thus, there are three separate equations to create the message key W. In the first case, the VK is modular added with the OK. Then, one of VK, OK is shifted with respect to the other −8 bits for example, and then the modular sum is again calculated. This process is repeated until all possible shifted combinations of VK, OK have been modular added.

In the second case, OK is used as a pointer into VK to select two values of VK to be modular added. Again, one of VK, OK is shifted with respect to the other −8 bits for example, and then the modular sum is again calculated. This process is repeated until all possible shifted combinations of VK, OK have been used to create the modular addition, i.e., the PDAF function of (VK, OK) for all possible shifted combinations.

In the third case, VK is used as a pointer into OK to select two values of OK to be modular added. Again, one of OK, VK is shifted with respect to the other—8 bits for example, and then the modular sum is again calculated. This process is repeated until all possible shifted combinations of OK, VK have been used to create the modular addition, i.e., the PDAF function of (OK, VK) for all possible shifted combinations.

Turning to FIG. 3, shown therein is the Qwyit Stream Cipher and Key Exchange/Update (QCy™).

The system issues three credentials: an OpenID that identifies the user for whom the message is intended, and two keys (EK, QK).

The process to SEND a message then occurs as follows:
Initialization: Generate random salt Open Return (OR)—a public value.
INITIALIZATION Step:
QK mod OR=$VK^P$, PDAF(EK, $VK^P$)=$VK^C$
EK mod OR=$OK^P$, PDAF(QK, $OK^P$)=$OK^C$
SELECTION Step:
$VK^{Pc[1...n]}_{Pv[1...n]}$ mod $OK^{Po[1...n]}$=$W_{1...n}^2$ Where pointers Pv and Po increment +1 through the entire key length for each cycle pointer Pc. If repeating, substitute $VK^{Next}$ and $OK^{Next}$ for each new cycle. There are two (2) additional/recommended PDAF Selection calculations set forth below.

CIPHER Step:
$W_{1...n}^2 \oplus PT_{1...n}^2 = CT_{1...n}^2$ repeating w/next cycle selection if more PT UPDATE Step:
PDAF($OK^C$, $VK^P$)=$VK^{Next}$ and PDAF($VK^C$, $OK^P$)=$OK^{Next}$ Return to the selection step until there is no more data to send.

MESSAGE Step:
Send OpenID, OR and CT to Recipient
The process to RECEIVE a message then occurs as follows:
Using the received random salt Open Return (OR) and the previously issued credentials, EK, QK, calculate as follows:
QK mod OR=$VK^P$, PDAF(EK, $VK^P$)=$VK^C$
EK mod OR=$OK^P$, PDAF(QK, $OK^P$)=$OK^C$
SELECTION Step:
$VK^{Pc[1 \ldots n]}$ mod $OK^{Po[1 \ldots n]}$=$W_{1 \ldots n}^2$
Where pointers Pv and Po increment +1 through the entire key length for each cycle pointer Pc. If repeating, substitute $VK^{Next}$ and $OK^{Next}$ for each new cycle. There are two (2) additional/recommended PDAF Selection calculations set forth below.
CIPHER Step:
$W_{1 \ldots n}^2 \oplus CT_{1 \ldots n}^2 = PT_{1 \ldots n}^2$ repeating w/next cycle selection if more CT
UPDATE Step:
PDAF($OK^C$, $VK^P$)=$VK^{Next}$ and PDAF($VK^C$, $OK^P$)=$OK^{Next}$
Return to the selection step until there is no more data to send. There are two (2) additional/recommended PDAF Selection calculations set forth below.

Qwyit No Communication Key Update

There are two (2) ways to get new Start Keys for the protocol of the present invention, QCy™:
Static Update: Using an out-of-band channel, the participants will share new 512-bit upper level, Start Keys at known intervals. This distribution is a public event, making the length of each 512-bit message chain known.
Pseudo-Random Update: Using any number of digits from any number of locations (existing EK, QK, Last W, etc.), and based on their values as stated by either the participant pair or the system owners, auto-update the Start Keys (EK, QK) using any combination of one-way Qwyit® primitives (PDAF/OWC, and/or Combine/Extract)—without any communication between the participants.

For example:
(1) Take the first 4 odd digits ($1^{st}$, $3^{rd}$, $5^{th}$, $7^{th}$) from the current EK and MOD 16 add them together ($1^{st}$+$3^{rd}$ and $2^{nd}$+$4^{th}$).
(2) At this interval, both participants (without communication between them) update the keys using a PDAF (EK, QK) to twice the size of their total length (e.g., if the EK and QK are 256-bits each, perform the PDAF to a length of 1024-bits.)
(3) Then perform an One-Way Cut (OWC) on this result, creating new EK, QK values
(4) Use the new values for the next interval.

Other primitives may certainly be used and will maintain the underdetermined system; but the PDAF/OWC combination is 100% guaranteed, is an unsolvable one-way gate between key versions and is highly recommended. Using this Qwyit® key update method works for other secret key cryptosystems as well. The above updates can be performed forever without loss of entropy or key 'degradation' of any kind (certainly well beyond the update need in any real-world system).

It's also entirely simple and possible to pre-share an additional small set of random data (for example an extra 256-bits), that is used exclusively in either key update mode above to perform a PDAF with that small secret key and any-length of the existing key (and what to use can certainly be pseudo-randomly selected). This extra material would never be used in any W child/message key creations, extending the underdetermined system, and placing another one-way gate from any discovered messages or even stolen keys. This type of system flexibility is another example of the tremendous potential of the present invention.

While the obvious difficulty/management of no or nil Communication updates is staying in synch with a shared key partner/device, it's quite straightforward to devise system 'recovery' strategies/options/methods. An example is keeping a set of the last n-updates, returning to a previous version upon discovery of mismatched messages. Each would need to be analyzed for 'weaknesses' (such as forcing an update by message theft/destruction, etc.), and the bottom line is that the security and advantage of No Communication makes it more than worthwhile to overcome any usage difficulty.

Direct QCy™ Replacement of AES and Other Cipher Implementations

In order to aid proliferation of QCy™, the simplest implementation is to directly replace an existing one that uses AES-256. For these, QCy™ can be installed, and immediately begin operation. This is because most AES-256 implementations use one of the stream cipher modes of operation (CBC, CTR, OFB, etc.)—even the Authenticated Encryption modes do as well (GSM, etc.) And almost all of these are called with two parameters, an open IV and the key (both 256-bits).

These correspond directly to the QCy™ OR as the IV and the key can be duplicated as the EK and QK. Should the AES implementation allow easy update to include an additional key in the encrypt/decrypt call, then that is preferred and these would be EK and QK. It's possible in the single key operation to modify the single key creating an 'original' $2^{nd}$ key (using PDAF/OWC, etc.), but the security isn't improved so this is only of value should the implementation not be publicly available (this is the case in most IoT implementations, where one has to perform serious detailed investigation to understand the Bluetooth security setup).

For other existing cipher implementations, the same input mapping should be performed (OR as any public seed or initialization vector, and secret keys as EK, QK). It should be remembered that the protocol of the present invention, QCy™, doesn't have any length requirements, so other cipher mapping using different key lengths can still be accomplished.

QCy™ PDAF_SEC Security Discussion

The security protocol of the present invention, an Authentication and Data Security protocol called Qwyit™, along with the accompanying QCy™ cipher, has real world required properties: speed, efficiency, flexibility, provable security. The security protocols deliver universally, and deserve worldwide proliferation.

These protocols have been built and tested, where the speed has been benchmarked and can be verified. By performing in a single clock cycle, the protocol of the present invention is deemed to be the world's fastest, as nothing can operate faster than one clock cycle.

Similarly, the protocol of the present invention is extremely efficient in bandwidth, code space, and universal application; hence it is also the world's most efficient. The protocol can be employed in a wide variety of products, making it extremely flexible. Finally, the protocol of the present invention employs provable security. Qwyit security has been proven by Shannon. First, here's Perfect Secrecy according to Shannon.

'Perfect Secrecy' is defined by requiring of a system that after a cryptogram is intercepted by the enemy the a posteriori probabilities of this cryptogram representing various messages be identically the same as the a priori probabilities of the same messages before the interception. It is shown that perfect secrecy is possible but requires, if the number of messages is finite, the same number of possible keys. If the message is thought of as being constantly generated at a given "rate" R (to be defined later), key must be generated at the same or a greater rate.

This is exactly what the PDAF does: generates the same number of key bits for every plaintext bit. The question is whether starting from a 'finite key', this generation is 'Ideal'. Here's the Ideal System according to Shannon.

It is possible to construct secrecy systems with a finite key for certain "languages" in which the equivocation does not approach zero as N→∞. In this case, no matter how much material is intercepted, the enemy still does not obtain a unique solution to the cipher but is left with many alternatives, all of reasonable probability. Such systems we call ideal systems. It is possible in any language to approximate such behavior—i.e., to make the approach to zero of H(N) recede out to arbitrarily large N. However, such systems have a number of drawbacks, such as complexity and sensitivity to errors in transmission of the cryptogram.

Shannon goes on to define/explain the structure of an Ideal System:

To approximate the ideal equivocation, one may first operate on the message with a transducer which removes all redundancies. After this almost any simple ciphering system—substitution, transposition, Vigen'ere, etc., is satisfactory. The more elaborate the transducer and the nearer the output is to the desired form, the more closely will the secrecy system approximate the ideal characteristic.

This is exactly the security engineering accomplishment of the present invention: the PDAF, used in every step of the QCy™ cryptosystem, generates endless Perfect Secrecy keys. The PDAF accomplishes Shannon's transducer that delivers, not approximates, the ideal characteristic. But in contrast to Shannon, the PDAF operates on the key not the message. The end result is an incredibly simple and straightforward process, which realizes QCy™'s most important goal: real world speed and efficiency. The QCy™ cipher performs the same simple ciphering system predicted in Perfect Secrecy, i.e., a simple plaintext XOR with the endless key. The present invention provides a finite key Ideal System for any bit 'language' where the PDAF generates Perfect Secrecy endless keys. The procotol of the present invention, QCy™, is underdetermined at every step (PDAF at the Start, in key Selection, and next key Update), producing the required property result: there are multiple possible answers throughout the entire use of the cryptosystem. As stated by Shannon, this is the equivalent and only real world differentiating property of Perfect Secrecy. Therefore QCy™ is Provably Secure.

In building our Perfect Secrecy Ideal System, we solved Shannon's complexity issues by engineering two distinct cryptographic innovations:

1. Random Rearrangement (RR). This involves digit position manipulation, based upon random inputs and modular arithmetic properties, including the use of remaining unused digit position values within a given input. This can be performed infinitely without any resulting randomness degradation; e.g., keys created using RR from existing random keys are unique, random and possess all the characteristics of independently generated random keys.
2. Reliant on RR, updating participant keys using a PDAF/OWC combination can be performed synchronously, without communication, and the security is perfectly one-way: past keys cannot be exclusively determined (the protocols of the present invention, Qwyit, create an underdetermined equation set that produces a large keyspace of incorrect values, a small set of valid values and one correct value.) Any system level keys—Master Authentication Keys, Session Start Keys, etc.—can forever be updated in a one-way, perfect, fast method without any required communication between key partners.

When these two techniques are used as the fundamental building blocks of our Qwyit Protocol and QCy™, the cipher and cryptosystem presents the identical properties of Perfect Secrecy; and therefore a finite key Ideal System. There is never total discernment of any result.

The PDAF RR can continually present a one-way, random stream of underdetermined keys that will never produce only one possibility. The QCy™ cipher uses the PDAF three times for Start, Selection and Update—and none of these results are ever exclusively determinable. Yes, one can search the entire short key space and return the correct result. But one is never certain which result out of the valid set is the correct one, as the PDAF will always return an underdetermined one-way small set of valid possibilities. Which continues during a cycle, into the next cycle, the next update, the next OR-seeded session—and since it's possible that any session has been Master Key updated with no communication such that even an all-powerful adversary does not know this has occurred, QCy will never produce a known broken singular result.

When analyzing QCy™ for Perfect Security Cross (See FIG. 1) attacks:

UP—Continuously defeated by the underdetermined, irreversible PDAF Offset Key Add mode.

RIGHT—Regardless of any previous message knowledge, including all values except the Master Keys, new message breaks are defeated by the same PDAF/OR reseed.

LEFT—Same as RIGHT.

DOWN—With only some PT knowledge and corresponding W section, the VK/OK keys all remain underdetermined for other sections, and maintain message key integrity.

See below for empirical demonstrations of Perfect Secrecy results, showing that all four Cross direction attacks are defeated.

In summary, this is the best cryptographic engineering can accomplish: the real world implementation of Shannon's Perfect Secrecy Ideal System, one thing is undeniably true:

Compared to any existing system, QCy™ is faster, more efficient, more flexible and indicatively more secure.

Empirical QCy™ Stream Cipher Result Outputs

"To prove that a scheme is perfectly secure, you must be able to show that for any pair of messages, the probability that they map to a given ciphertext is identical. This would usually be a straightforward probability argument. One example of a perfectly secure system is a one-time pad."— CryptoProofs.

Figure 8:
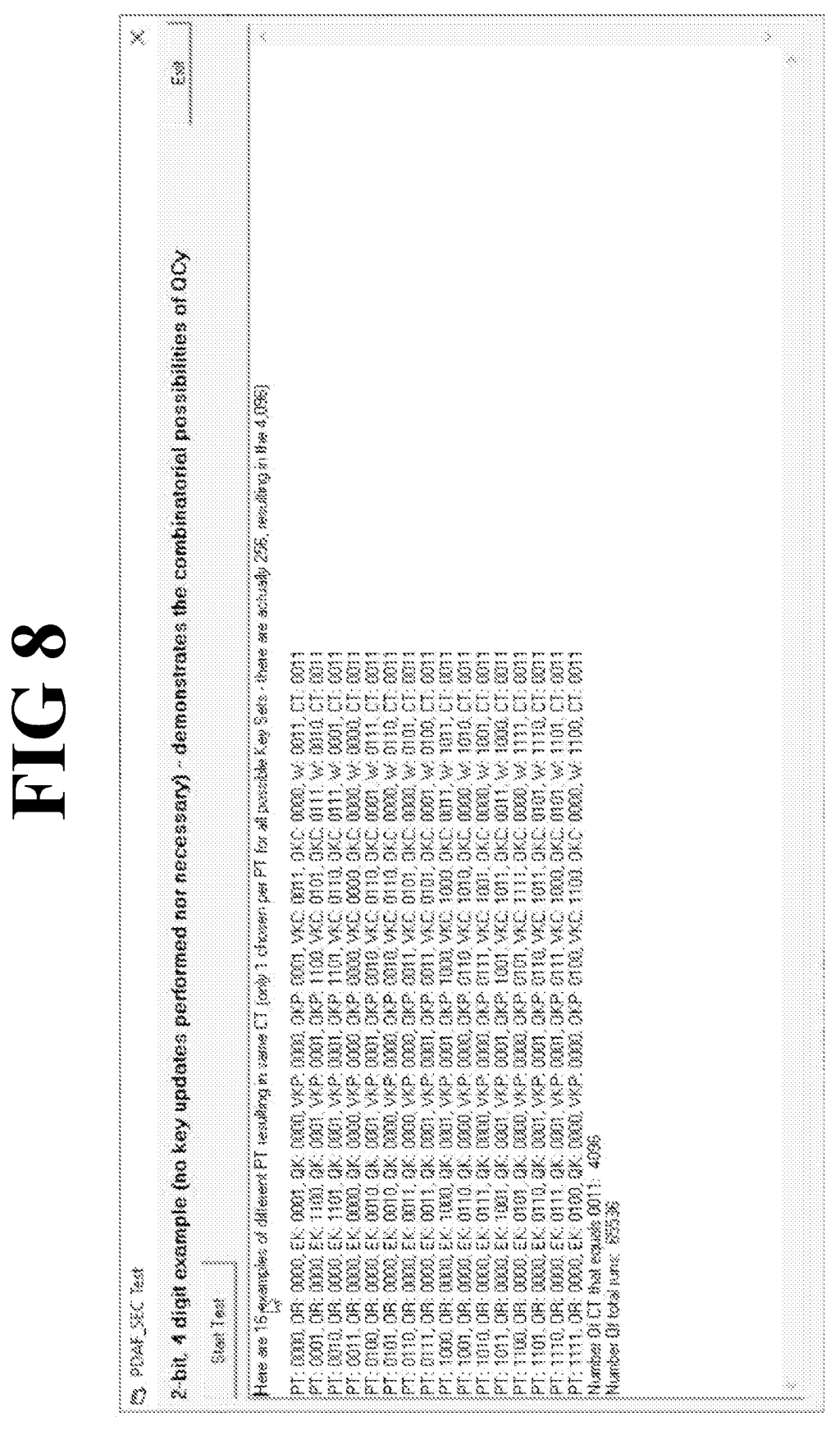

As engineers, we firmly believe in real world testing and examples. Scale model testing is an excellent method for distilling methodology down to the core capability as well as highlighting problems. In performing a 2-bit, 4-digit version of QCy™, the provable security is apparent and obvious. FIG. 8 shows a screen capture of a program written to execute this scaled down version. This small version execution shows that for every possible PT (there are 16; 0000, 0001, 0010, etc.), calculated with every possible OR (16), using every possible QK (16) and EK (16), there are 4,096 identical PT-to-CT mappings out of the 65,536 total possibilities.

Referring to FIG. 8, the program shows one for every same PT, where there are 256; e.g., for every different PT against all possible key sets (OR, QK, EK, which is 163 or 4,096), there are 256 identical PT-to-CT mappings. Since there are 16 different possible PTs, there are 16*256 identical sets (4,096) out of the total 65,536 different PT/OR/QK/EK pairings. This empirical QCy™ execution demonstrates the combinatorial probabilities at any key size. The larger the key, the smaller the percentage valid set of possible answers (only one is ever correct). For any particular ciphertext, there is a straightforward probability mapping of multiple plaintexts: QCy™ is provably secure and delivers a true Perfect Secrecy Ideal System.

This is demonstrably true for any QCy™ Session Start, Selection Case and Cipher. The only remaining security discussion is whether our innovative QCy™ Random Rearrangement property used in Key Update provides a truly new random key set for the next cycle.

Turning to FIG. 7, shown therein is the protocol of the present invention and the various values calculated as part of the protocol. FIG. 7 shows the reference PDAF_SEC function operation (all three Selection Cycles, XOR cipher and Key Update results) from an example key set and plaintext (VKstart and OKstart created as per Session Start; MOD 16 with OR, then PDAF mixed with EK, QK).

Example 1: PDAF Random Rearrangement Uniqueness

FIG. 5 shows a screen capture of a small program written to perform 1 Billion PDAF Random Rearrangements (RR) using the PDAF function as called for in the PDAF_SEC QCy™ encryption key Update. As shown, if the keys are random to start, this PRNG process ends with random keys; the 1B updates represent 12.288 TB of encrypted data (using all 3 Selection Cases). Key updates in this manner provide a provably mathematic one-way gate; and have long-lasting system capability, limiting the number of times a Static new key delivery is 'required'. All of the key changes when appended pass all statistical Random tests (Diehard, NIST Statistical Test Suite tested).

Example 2: Two Plaintexts Producing Identical CT (Identical Probability Mapping)

FIG. 6 shows a screen capture from 3 different runs of a small program written to QCy™ encrypt two different PTs ("Paul" and "Saul") using the same OR and resulting in different start keys creating the exact same CT (this is the "Attack at Dawn" vs "Attack at Dusk" classic dilemma—Mapping different PT to identical CT). Multiple different start keys will deliver identical Ciphertext from different Plaintexts using the same OR salt.

In order to find keys that create the same CT from different PTs, instead of attempting to compare the output to the entire keyspace ($16^8$ for 4-digit keys), for speed, this example was set up to choose 100K random keys (and same static OR) encrypting "Saul" and test the ciphertext output against the "Paul" differently keyed yet same OR ciphertext. Notice that different keys return different probabilities (2 identical, then none (not meaning there aren't any just none in the 100K tested, then 1)—and this will change dependent on which PDAF Selection Case is being run, combined, etc. In this program, all three PDAF Selection Cases were used.

Integrated Circuit Embodiment

The authentication and encryption protocol of the present invention has been implemented on an Intel field programmable gate array, i.e., the Arria V GX and the Stratix V GX. Additionally, the protocol has been simulated on an Achronix Speedster FPGA with the same results. The implementation of the Arria V has been tested to 150 MHz using 256 bit keys. The Stratix V has been tested to 300 MHz using 256 bit keys. The Stratix V has also been tested to 150 MHz using 1024 bit keys. Each of these implementations uses a single clock cycle to perform the encrypt or decrypt function, as well as the key update when needed, e.g., a new value key and offset key are calculated and replace the current value key and offset keys used in the protocol.

The Verilog program to program the FPGA requires less than 500 lines of code, making the code very efficient and straightforward. The code uses several modules.

An initialization module uses the keys, EK, QK and the Open Return (OR) to calculate the two pointers ($VK^P$ and $OK^P$), and the current versions of the ValueKey (VK) and OffsetKey (OK), as discussed above. The values for each of these variables are defined in accordance with the desired bit length, e.g., 256-bits.

In accordance with the PDAF function, the pointer selects one of 16-possible hex values in the next n-positions measured from the current position of the value to which the pointer points. In the case of 256-bits, n becomes 16. Thus, to cycle past the end, a longer version of certain variables is required when using them in a PDAF function. These are created simply by defining these certain variables to be double their initial variables, and then using these double versions in the PDAF function. So, if the current position is the last byte (8 bits), then the pointer can specify one of the next 16 bytes, which would point to the first 16 bytes in the second half of the double version of this variable.

In general, the PDAF function is then implemented by starting at the first byte of the value key, then determining the value of the pointer in the first byte of the pointer, which determines which byte of the value key is to be added to the first byte of the value key. For example, using 8 bits as a byte, and the first 4 bits as the value for the pointer, we can add the first byte of the value key to one of sixteen next possible bytes of the same value key. The module uses the 4 bits (termed a "nibble") as an input to a case function in Verilog and then depending on the value of the nibble, selects an equation that adds the appropriate two values of the value key. This process is repeated for each byte of the value key to create the output of the PDAF, which will be 256 bits in this example.

So, the initialization module uses this PDAF function to create the current value key and current offset key. The current value key and current offset key are then passed to a case 1 module that performs a modular add of each byte of the current value key and current offset key to arrive at the key (W). The key (W) is then XORed with plain text (or cipher text) to create the cipher text (or plain text). This embodiment uses a 256-bit XOR function for speed purposes, but other length XOR functions could be used.

A case 23 module performs a PDAF of two inputs, then the 256 bit XOR function. In case 2, the inputs are the current value key and current offset key (pointer), whereas in case 3 the inputs are the current offset key and current value key (pointer).

A next value key and offset key module calculates the next values for the value key and offset key using the same PDAF functions, with the value key pointer and the offset key pointers used as described above.

A top module controls the timing of the function calls and the processing of the input data, so that a single clock cycle is used to perform the initialization module and one key length encryption. Each clock cycle then triggers the next input and encryption calculation. Thirty-two (32) encryption functions are performed using case 1, then 32 more for case 2 and then 32 more for case 3, which then triggers the module to calculate the next value key and offset key. The top module then returns the functioning to the beginning and case 1 is then performed for the next input packet.

At the beginning edge of each clock cycle, the top module begins a loop that counts 96 times. This module is designed to operate on 256 bits. Different sized packets would require different loops. This module also operates on 8-bit bytes, but different sizes could be used as well. For each iteration, the top module uses an 8-bit shifted version of the current value key. So for the first iteration and $33^{rd}$ iteration the top module uses the base version of the current value key. For the second iteration and the $34^{th}$ iteration, the top module uses one byte shifted versions of the current value key. Then in the third and $35^{th}$ iteration, the top module uses a two byte shifted version of the current value key. And so on, until the $32^{nd}$ iteration and the $64^{th}$ iteration, the top module uses a 31-byte shifted version of the current value key. Thus, all possible one byte shifted versions of the current value key have been used. For the $65^{th}$ through $96^{th}$ iterations, the top module shifts the current offset key one byte each time.

The various shifted versions of the current value key and current offset key are then used in the case 1, case 23 and case 23 calls to these modules, thereby performing the specified case 1, case 2 and case 3 operations as described above. Case 23 is used twice by simply changing the order of the inputs, which then performs case 2 or case 3 depending on the order of the inputs.

Once all 96 iterations have been performed, one 256-bit operation for each clock cycle, the next values for VK and OK are determined, and then used to replace the current values for VK and OK, and the process repeats for another 96 iterations, assuming there is more data to encrypt or decrypt.

CONCLUSION

It's obvious from these examples, the underdetermined every-step PDAF processing, and even all-powerful N→∞ capture of every message, that QCy™ is, indeed, an Ideal System. An attacker will never positively gain knowledge through the system from any brute force result that it is correct; the work expands to ∞ with every possible unknown PDAF/OWC Master Key update having to be re-started from the beginning and computed through to the present, only to be left w/still multiple possible results. The point is proven: Identical mapping of two different PTs to a single CT means Perfect Secrecy. QCy™ is an Ideal System. And although this is an incredibly powerful—and final—cryptographic result, the main supremacy of QCy™ is Real World practicality: QCy™ is the Fastest, Most Efficient, Most Secure Encryption Engine in The World.

QCy™ Stream Cipher Reference Code

The following two reference code Qwyit™ functions are provided: PDAF and PDAF_SEC. The PDAF_SEC is the Qwyit encryption/decryption function. The PDAF is used for key updates:

| FUNCTION: Position Digit Algebra Function - (PDAF) |
| --- |

```
' NAME:    PDAF
'
' PURPOSE: Returns a key expansion based on single or dual key input
'
' TYPE:    Qwyit specific function - uses strings/byte return
'
' CALL:    PDAF_SEC(sValueKey, nMode, Optional nDigits, Optional sOffsetKey)
'          where sValueKey is the Value Key from which to select,
'          nMode is whether to perform a ValueKey Offset add (nMode = 1) or
'             perform the default dual-key pointer add (nMode = 0)
'          Optional nDigits is how many 4-bit digits to return (If 0, then return all cycles - which is '
'          the length of the ValueKey squared)
'          Optional sOffsetKey is the key which points into the ValueKey for selection (if entered, it
'             MUST be the same size as the ValueKey)
'             (if not entered, the OffsetKey will be the ValueKey)
'
' RTRN:    Byte result of the key material - either all cycles [len(ValueKey] squared), or nDigits
'
' ERROR:   Null return
'
' Example: PDAF("0123456789ABCDEF", 0, 0, "FEDCBA9876543210") returns
 "FFFFFFFFFFFFFFFF00000000000000001111111111111111222222222222222233333333
 3333334444444444444444555555555555555566666666666666667777777777777777888888888
 88888889999999999999999AAAAAAAAAAAAAAAABBBBBBBBBBBBBBBBCCCCCCCC
 CCCCCCCCDDDDDDDDDDDDDDDDEEEEEEEEEEEEEEEE"
' Example: PDAF("FB382C001A", 0, 30, "CC69100AB4") returns
 "B7913C0ACE7FEBD00B53F4851014AF"
' Example: PDAF("0123456789ABCDEF", 1, 0, "FEDCBA9876543210") returns
 "0123456789ABCDEF23456789ABCDEF01456789ABCDEF01236789ABCDEF01234589AB
 CDEF01234567ABCDEF0123456789CDEF0123456789ABEF0123456789ABCD0123456789
 ABCDEF23456789ABCDEF01456789ABCDEF01236789ABCDEF01234589ABCDEF012345
 67ABCDEF0123456789CDEF0123456789ABEF0123456789ABCD"
' Example: PDAF("FB382C001A", 1, 30, "CC69100AB4") returns
```

"7DD02C010CDF74C01B5BF8D811B92B"
'
'
' Test Vector: The examples are the test vectors
'
Public Function PDAF(sValueKey As String, nMode As Integer, Optional nDigits As Integer, Optional sOffsetKey As String) As Variant
Dim t_Key( ) As Byte
Dim nKey As Long
Dim t_sKey As String
Dim sKey As String
Dim sAddKey As String
Dim sPointKey As String
Dim sHoldTemp As String
Dim sHoldFirst As String
Dim sTmpVal As String
If sValueKey = Null Or sValueKey ="" Then
   PDAF = ""
   Exit Function
Else
   If sOffsetKey = "" Or sOffsetKey = Null Then
     sOffsetKey = s ValueKey
   End If
End If
sPointKey = sOffsetKey
sAddKey = sValueKey
nLen = Len(sAddKey)
If nDigits = 0 Then
   nN_Max = nLen * nLen
Else
   nN_Max = nDigits
End If
ReDim t_Key(nN_Max)
If nMode = 0 Then 'Dual Key Add mode
   p = 1 'Pointer starts at 1
   c = 0 'Cycle starts at 0
   nN = 0 'Counter for how much key material
   Do
     Formula1 = Val("&H" & Mid(sPointKey, p, 1))
     Formula2 = Val("&H" & Mid(sAddKey, p + c, 1))
     t_Key(nN) = Asc(Hex((Formula1 + Formula2) Mod 16))
     nN=nN + 1
     If nN = nN_Max Then
       Exit Do
     End If
     p = p + 1
     If p > nLen Then
       p = 1
       c = c + 1
     End If
   Loop
Else 'nMode < >0 so do the Key Offset Add mode
   'Expand the keys for ease in going 'round the corner' in digit selection
   While Len(sAddKey) < (2 * nLen) + 17
     sAddKey =Trim(Trim(sAddKey) & Trim(sAddKey))
   Wend
   nLen2 = Len(sPointKey)
   While Len(sPointKey) < (2 * nLen2) + 17
     sPointKey =Trim(Trim(sPointKey) & Trim(sPointKey))
   Wend
   p = 1 'Pointer starts at 1
   c = 0 'Cycle starts at 0
   nN =0 'Counter for how much key material
   Do
     Formula1 = Val("&H" & Mid(sAddKey, p + c, 1))
     'nOffset = Val("&H" & Mid(sPointKey, p, 1)) + 1
     'Formula2 = Val("&H" & Mid(sAddKey, p + nOffset + c, 1))
     Formula2 = Val("&H" & Mid(sAddKey, p+ Val("&H" & Mid(sPointKey, p, 1)) + 1+ c, 1))
     t_Key(nN) = Asc(Hex((Formula1 + Formula2) Mod 16))
     nN = nN + 1
     If nN = nN_Max Then
       Exit Do
     End If
     p = p + 1
     If p > nLen Then
       p = 1
       c = c + 1
     End If
   Loop

```
End If
'Return a byte
PDAF = t_Key( )
End Function
```

| FUNCTION: Position Digit Algebra Function Security - Enc/Dec (PDAF_SEC) |
|---|

```
'
'NAME:     PDAF_SEC
'
'PURPOSE: Returns an XOR result of the Plaintext w/the PDAF never-ending result
'
'TYPE:     Qwyit specific function - uses string inputs, byte output
'
' CALL:    PDAF_SEC(sValueKey, , sKeyResult, sTargettext, sOR, [sOffsetKey])
'       where s ValueKey is the Value Key from which to select [This is the Qwyit Auth Key, EK],
'       sKeyResult is the Qwyit Auth Key, KR (which is formed by (QK MOD16 EK))
'       sTargettext is either the plaintext to be encrypted or the ciphertext to be decrypted,
'       SOR is the OpenReturn (an initialization vector for cycle updates)
'       Optionally, sOffsetKey is the key from which to set the offset (If no value, sValueKey
will be duplicated for use as the OffsetKey - if included, it MUST be the same length as the
ValueKey)
'         [This is the Qwyit Auth Key, QK]
'
' RTRN:    Byte result of the key material
'
' ERROR:   Null return
'
' Example: The test vector file is the example
'
' Test Vector: The test vector file is the test vector
'
Public Function PDAF_SEC(sValueKey As String, sKeyResult As String, sTargetText As
String, SOR As String, Optional sOffsetKey As String) As Variant
Dim t_Key( ) As Byte
Dim PDAF_AddKey( ) As Byte
Dim PDAF_PointKey( ) As Byte
Dim sAddKey As String
Dim sPointKey As String
Dim PDAF_AddKeyPointer( ) As Byte
Dim PDAF_PointKeyPointer( ) As Byte
Dim sValueKeyPointer As String
Dim sOffsetKeyPointer As String
Dim nCases As Integer
If sValueKey = Null Or sValueKey = "" Or SOR = "" Or SOR = Null Then
    PDAF_SEC = ""
    Exit Function
Else
   If sOffsetKey = "" Or sOffsetKey = Null Then
     sOffsetKey = sValueKey
   End If
End If
'SESSION START: Control step for reconfiguring the start keys
sValueKeyPointer = MOD16(sOffsetKey, SOR) 'The OffsetKey is QK
sOffsetKeyPointer = MOD16(sValueKey, sOR) 'The ValueKey is EK
PDAF_AddKeyPointer = PDAF(sValueKey, 1, 64, sValueKeyPointer)
PDAF_PointKeyPointer = PDAF(sOffsetKey, 1, 64, sOffsetKeyPointer)
    'This is just to get back to strings...but shouldn't be needed in other platforms...(slows things
down! :(
   For 1Count = 0 To UBound(PDAF_PointKeyPointer) - 1
      sAddKey = sAddKey & Chr(PDAF_AddKeyPointer(1Count))
      sPointKey = sPointKey & Chr(PDAF_PointKeyPointer(1Count))
   Next
'Set the length of bytes returned
nN_Max = Len(sTargetText)
ReDim t_Key(nN_Max)
nLen = Len(sAddKey)
While Len(sAddKey) < (2 * nLen) + 17
   sAddKey =Trim(Trim(sAddKey) & Trim(sAddKey))
Wend
nLen2 = Len(sPointKey)
While Len(sPointKey) < (2* nLen2) + 17
   sPointKey = Trim(Trim(sPointKey) & Trim(sPointKey))
Wend
p = 1 'Pointer starts at 1
C = 0 'Cycle starts at 0
nN = 0 'Counter for how much key material
Do
```

```
'Beginning of CASES
'CASE #1 - DUAL KEY ADD mode, ValueKey plus OffsetKey, starting at digit 1 of each
and adding that position
    'VK1 + OK1 = W1
'   Using the AddKey for cycling through
    'SELECTION (Just for definition...it is performed all in one Select & Cipher command
next...)
        'Formula1 = Val("&H" & Mid(sPointKey, p, 1))
        'Formula2 = Val("&H" & Mid(sAddKey, p +C, 1))
        'sTmp Val = Hex((Formula1 + Formula2) Mod 16)
        'CIPHER (encrypt/decrypt)
        'IF selection performed above...
            't_Key(nN) = Asc(sTmpVal) Xor Asc(Mid(sTargetText, nN+1, 1))
        'For speed, perform SELECTION and CIPHER in one command...[not really much
faster...]
        t_Key(nN) = Asc(Hex((Val("&H" & Mid(sPointKey, p, 1)) + Val("&H" &
Mid(sAddKey, p + C, 1))) Mod 16)) Xor Asc(Mid(sTargetText, nN + 1, 1))
        nN = nN + 1
        If nN = nN Max Then
            'We're done w/all the TargetText
            Exit Do
        End If
    'END Of CASE #1
    'CASE #2 - OFFSET KEY ADD mode, ValueKey plus OffsetKey into ValueKey, starting
at digit 'one to the right' = zeroth digit
    'VK1 + VKx = W2
'  Using the AddKey for cycling through
    'SELECTION (Just for definition...it is performed all in one Select & Cipher command
next...)
        'Formula1 = Val("&H" & Mid(sAddKey, p+ Val("&H" & Mid(sPointKey, p, 1)) + 1, 1))
        'Formula2 = Val("&H" & Mid(sAddKey, p + C, 1))
        'sTmp Val = Hex((Formula1 + Formula2) Mod 16)
        'CIPHER (encrypt/decrypt)
        'IF selection performed above...
            't_Key(nN) = Asc(sTmpVal) Xor Asc(Mid(sTargetText, nN+1, 1))
        'For speed, perform SELECTION and CIPHER in one command...
        t_Key(nN) = Asc(Hex((Val("&H" & Mid(sAddKey, p + Val("&H" & Mid(sPointKey, p,
1)) + 1, 1)) + Val("&H" & Mid(sAddKey, p + C, 1))) Mod 16)) Xor Asc(Mid(sTargetText, nN +
1, 1))
        nN = nN + 1
        If nN = nN Max Then
            'We're done w/all the TargetText
            Exit Do
        End If
    'END Of CASE #2
    'CASE #3 - OFFSET KEY ADD mode, OffsetKey plus ValueKey into OffsetKey, starting
at digit 'one to the right' = zeroth digit
    'OK1 + OKx = W3
'  Using the PointKey for cycling through
    'SELECTION (Just for definition...it is performed all in one Select & Cipher command
next...)
        'Formula1 = Val("&H" & Mid(sPointKey, p + Val("&H" & Mid(sAddKey, p, 1)) + 1, 1))
        'Formula2 = Val("&H" & Mid(sPointKey, p + C, 1))
        'sTmp Val = Hex((Formula1 + Formula2) Mod 16)
        'CIPHER (encrypt/decrypt)
        'IF selection performed above...
            't_Key(nN) = Asc(sTmpVal) Xor Asc(Mid(sTargetText, nN+1, 1))
        'For speed, perform SELECTION and CIPHER in one command...
        t_Key(nN) = Asc(Hex((Val("&H" & Mid(sPointKey, p + Val("&H" & Mid(sAddKey, p,
1)) + 1, 1)) + Val("&H" & Mid(sPointKey, p + C, 1))) Mod 16)) Xor Asc(Mid(sTargetText,
nN + 1,1))
        nN = nN + 1
        If nN = nN_Max Then
            'We're done w/all the TargetText
            Exit Do
        End If
    'END Of CASE #3
    p = p + 1
    'UPDATE test
    If p > nLen Then
        p = 1
        C = C + 1
        If C = nLen Then
            'Ok, we're at the end of the cycles, and since still need more results for enc/dec, reseed
keys
            C = 0
            'PERFORM UPDATE
            PDAF_PointKey = PDAF(sAddKey, 1, 64, sKeyResult)
            PDAF_AddKey = PDAF(sPointKey, 1,64, sAddKey)
```

```
        sAddKey = ""
        sPointKey = ""
        'This is just to get back to strings...but shouldn't be needed in other platforms...(slows
things down! :(
            For 1Count = 0 To UBound(PDAF_PointKey) - 1
                sAddKey = sAddKey & Chr(PDAF_PointKey(1Count))
                sPointKey = sPointKey & Chr(PDAF_AddKey(1Count))
            Next
            'Then stretch out the keys for easy 'around the corner' calculations
            While Len(sAddKey) < (2 * nLen) + 17
                sAddKey = Trim(Trim(sAddKey) & Trim(sAddKey))
            Wend
            While Len(sPointKey) < (2 * nLen2) + 17
                sPointKey = Trim(Trim(sPointKey) & Trim(sPointKey))
            Wend
        End If
    End If
Loop
'Return a byte
PDAF_SEC = t_Key( )
End Function
```

What is claimed is:

1. A method for performing symmetrical encryption of data represented in a plurality of input packets comprising:
receiving a clock signal having a plurality of clock cycles from a clock;
receiving the plurality of input packets synchronized with said clock signal; and
encrypting an input packet of the plurality of input packets during each clock cycle of the plurality of clock cycles by:
a) modular adding a pseudorandom number and a first master key to obtain a value key pointer;
b) modular adding the pseudorandom number and a second master key to obtain an offset key pointer;
c) calculating a first position digital algebraic function using the offset key pointer to point into the first master key to obtain a current value key;
d) calculating a second position digital algebraic function using the value key pointer to point into the second master key to obtain a current offset key;
e) modular adding the current value key with the current offset key and shifting them with respect to each other and repeating the modular adding to create a first plurality of message keys, each having a predetermined bit length;
f) calculating a third position digital algebraic function using the current offset key to point into the current value key, and shifting them with respect to each other and repeating the calculation of the third position digit algebraic function to create a second plurality of message keys, each having said predetermined bit length;
g) calculating a fourth position digital algebraic function using the current value key to point into the current offset key, and shifting them with respect to each other and repeating the calculation of the fourth position digit algebraic function to create a third plurality of message keys, each having said predetermined bit length;
h) performing an exclusive OR function with the first plurality of message keys and a first set of packets of the plurality of input packets to create a first set of packets of a plurality of output packets, each having said predetermined bit length;
i) performing an exclusive OR function with the second plurality of message keys and a second set of packets of the plurality of input packets to create a second set of packets of the plurality of output packets, each having said predetermined bit length; and
j) performing an exclusive OR function with the third plurality of message keys and a third set of packets of the plurality of input packets to create a third set of packets of the plurality of output packets, each having said predetermined bit length; and
outputting said input packet of the plurality of output packets as an encrypted data packet before an end of said each clock cycle of the plurality of clock cycles.

2. The method according to claim 1, further comprising:
k) calculating a fifth position digital algebraic function using the value key pointer to point into the current offset key to obtain a next value key;
l) Calculating a sixth position digital algebraic function using the offset key pointer to point into the current value key to obtain a next offset key; and
m) replacing the current value key with the next value key and replacing the current offset key with the next offset key and repeating steps e) through j) for additional sets of the plurality of input packets to create additional sets of the plurality of output packets.

3. The method according to claim 1, further comprising:
k) calculating a fifth position digital algebraic function using the value key pointer to point into the current offset key to obtain a next value key;
l) Calculating a sixth position digital algebraic function using the offset key pointer to point into the current value key to obtain a next offset key; and
m) replacing the current value key with the next value key and replacing the current offset key with the next offset key and repeating steps e) through m) for additional sets of the plurality of input packets to create additional sets of the plurality of output packets.

4. The method according to claim 1, further comprising storing the first master key and the second master key.

5. The method according to claim 1, further comprising generating the pseudorandom number having said predetermined bit length.

6. A method for encrypting data comprising:
receiving a clock signal having a plurality of clock cycles from a clock;
receiving a plurality of plaintext packets synchronized with said clock signal; and encrypting a plaintext packet of the plurality of plaintext packets during each clock cycle of the plurality of clock cycles to create a ciphertext packet of a plurality of ciphertext packets by:
- a) modular adding a pseudorandom number and a first master key to obtain a value key pointer;
- b) modular adding the pseudorandom number and a second master key to obtain an offset key pointer;
- c) calculating a first position digital algebraic function using the offset key pointer to point into the first master key to obtain a current value key;
- d) calculating a second position digital algebraic function using the value key pointer to point into the second master key to obtain a current offset key;
- e) calculating a third position digital algebraic function using the current offset key and the current value key, and shifting them with respect to each other and repeating the calculating of the third position digit algebraic function to create a plurality of message keys; and calculating an exclusive OR function with the plurality of message keys and the plurality of plaintext packets to create said plurality of ciphertext packets; and outputting said ciphertext packet of the plurality of ciphertext packets before an end of said each clock cycle.

7. The method according to claim 6, further comprising:
- f) calculating a fourth position digital algebraic function using the value key pointer to point into the current offset key to obtain a next value key;
- g) calculating a fifth position digital algebraic function using the offset key pointer to point into the current value key to obtain a next offset key; and
- h) replacing the current value key with the next value key and replacing the current offset key with the next offset key and repeating steps e) through f) to process any additional packets.

8. The method according to claim 6, further comprising:
- f) calculating a fourth position digital algebraic function using the value key pointer to point into the current offset key to obtain a next value key;
- g) calculating a fifth position digital algebraic function using the offset key pointer to point into the current value key to obtain a next offset key; and
- h) replacing the current value key with the next value key and replacing the current offset key with the next offset key and repeating steps e) through i) to process any additional packets.

9. The method according to claim 6, further comprising storing the first master key and the second master key.

10. The method according to claim 6, further comprising generating the pseudorandom number.

11. A method for performing symmetrical decryption of data represented in a plurality of input packets comprising:
receiving a clock signal having a plurality of clock cycles from a clock;
receiving the plurality of input packets synchronized with said clock signal; and
encrypting an input packet of the plurality of input packets during each clock cycle of the plurality of clock cycles by:
- a) modular adding a pseudorandom number and a first master key to obtain a value key pointer;
- b) modular adding the pseudorandom number and a second master key to obtain an offset key pointer;
- c) calculating a first position digital algebraic function using the offset key pointer to point into the first master key to obtain a current value key;
- d) calculating a second position digital algebraic function using the value key pointer to point into the second master key to obtain a current offset key;
- e) modular adding the current value key with the current offset key and shifting them with respect to each other and repeating the modular adding to create a first plurality of message keys, each having a predetermined bit length;
- f) calculating a third position digital algebraic function using the current offset key to point into the current value key, and shifting them with respect to each other and repeating the calculation of the third position digit algebraic function to create a second plurality of message keys, each having said predetermined bit length;
- g) calculating a fourth position digital algebraic function using the current value key to point into the current offset key, and shifting them with respect to each other and repeating the calculation of the fourth position digit algebraic function to create a third plurality of message keys, each having said predetermined bit length;
- h) performing an exclusive OR function with the first plurality of message keys and a first set of packets of the plurality of input packets to create a first set of packets of a plurality of output packets, each having said predetermined bit length;
- i) performing an exclusive OR function with the second plurality of message keys and a second set of packets of the plurality of input packets to create a second set of packets of the plurality of output packets, each having said predetermined bit length; and
- j) performing an exclusive OR function with the third plurality of message keys and a third set of packets of the plurality of input packets to create a third set of packets of the plurality of output packets, each having said predetermined bit length; and outputting an output packet of the plurality of output packets as a decrypted data packet before an end of said each clock cycle of the plurality of clock cycles.

12. The method according to claim 11, further comprising:
- k) calculating a fifth position digital algebraic function using the value key pointer to point into the current offset key to obtain a next value key;
- l) Calculating a sixth position digital algebraic function using the offset key pointer to point into the current value key to obtain a next offset key; and
- m) replacing the current value key with the next value key and replacing the current offset key with the next offset key and repeating steps e) through j) for additional sets of the plurality of input packets to create additional sets of the plurality of output packets.

13. The method according to claim 11, further comprising:
- k) calculating a fifth position digital algebraic function using the value key pointer to point into the current offset key to obtain a next value key;
- l) Calculating a sixth position digital algebraic function using the offset key pointer to point into the current value key to obtain a next offset key; and
- m) replacing the current value key with the next value key and replacing the current offset key with the next offset key and repeating steps e) through m) for additional sets of the plurality of input packets to create additional sets of the plurality of output packets.

14. The method according to claim 11, further comprising storing the first master key and the second master key.

15. The method according to claim 11, further comprising generating the pseudorandom number having said predetermined bit length.

16. A method for decrypting data comprising:
receiving a clock signal having a plurality of clock cycles from a clock;
receiving a plurality of ciphertext packets synchronized with said clock signal; and
decrypting a ciphertext packet of the plurality of ciphertext packets during each clock cycle of the plurality of clock cycles to create a plaintext packet of a plurality of plaintext packets by:
a) modular adding a pseudorandom number and a first master key to obtain a value key pointer;
b) modular adding the pseudorandom number and a second master key to obtain an offset key pointer;
c) calculating a first position digital algebraic function using the offset key pointer to point into the first master key to obtain a current value key;
d) calculating a second position digital algebraic function using the value key pointer to point into the second master key to obtain a current offset key;
e) calculating a third position digital algebraic function using the current offset key and the current value key, and shifting them with respect to each other and repeating the calculating of the third position digit algebraic function to create a plurality of message keys; and
calculating an exclusive OR function with the plurality of message keys and the plurality of ciphertext packets to create said plurality of plaintext packets; and
outputting the plaintext packet of the plurality of plaintext packets before an end of said each clock cycle.

17. The method according to claim 6, further comprising:
i) calculating a fourth position digital algebraic function using the value key pointer to point into the current offset key to obtain a next value key;
j) calculating a fifth position digital algebraic function using the offset key pointer to point into the current value key to obtain a next offset key; and
k) replacing the current value key with the next value key and replacing the current offset key with the next offset key and repeating steps e) through f) to process any additional packets.

18. The method according to claim 6, further comprising:
f) calculating a fourth position digital algebraic function using the value key pointer to point into the current offset key to obtain a next value key;
g) calculating a fifth position digital algebraic function using the offset key pointer to point into the current value key to obtain a next offset key; and
h) replacing the current value key with the next value key and replacing the current offset key with the next offset key and repeating steps e) through i) to process any additional packets.

19. The method according to claim 6, further comprising storing the first master key and the second master key.

20. The method according to claim 6, further comprising generating the pseudorandom number.

* * * * *